US012645721B2

(12) United States Patent
Bhatt et al.

(10) Patent No.: US 12,645,721 B2
(45) Date of Patent: Jun. 2, 2026

(54) SYSTEMS AND METHODS FOR PROVIDING RELIABLE INFORMATION FOR QUERIES

(71) Applicant: Microsoft Technology Licensing, LLC, Redmond, WA (US)

(72) Inventors: Vijay Bhatt, Bengaluru (IN); Prerana Nayak, Hyderabad (IN); Trishna Jatin Shah, Hyderabad (IN); Veeran Bansal Gupta, Hyderabad (IN); Gaurav Khandelwal, Hyderabad (IN); Ravi Tej Srireddy, Hyderabad (IN); Anushree Bishnoi, Mumbai (IN); Amritha Vardhini Ravuri, Bengaluru (IN); Priyanka Sarkar, Bengaluru (IN); Abhishek Ojha, Bengaluru (IN); Manish Kumar, Hyderabad (IN); Dipanshu, Hyderabad (IN); Rajkumar Surana, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/783,268

(22) Filed: Jul. 24, 2024

(65) Prior Publication Data

US 2025/0272326 A1      Aug. 28, 2025

(30) Foreign Application Priority Data

Feb. 23, 2024    (IN) .............................. 202411013245

(51) Int. Cl.
*G06F 16/00*          (2019.01)
*G06F 16/3329*      (2025.01)
*G06F 16/334*        (2025.01)

(52) U.S. Cl.
CPC ...... *G06F 16/3347* (2019.01); *G06F 16/3329* (2019.01)

(58) Field of Classification Search
CPC ........... G06F 16/33295; G06F 16/3329; G06F 16/3347

(Continued)

(56) References Cited

U.S. PATENT DOCUMENTS

| | | |
|---|---|---|
| 2008/0215541 A1 | 9/2008 | Li |
| 2009/0162824 A1* | 6/2009 | Heck ...................... G06Q 10/10 434/362 |

(Continued)

FOREIGN PATENT DOCUMENTS

| | | |
|---|---|---|
| CN | 117194647 A | 12/2023 |
| KR | 20100097542 A | 9/2010 |

OTHER PUBLICATIONS

Bendersky, et al., "Analysis of Long Queries in a Large Scale Search Log", Proceedings of the 2009 workshop on Web Search Click Data, Feb. 9, 2009, 7 pages.

(Continued)

*Primary Examiner* — Monica M Pyo

(74) *Attorney, Agent, or Firm* — Ray Quinney & Nebeker P.C.; Christopher K. Hallstrom

(57)          ABSTRACT

The application generally relates providing reliable information to a user. A device may receive a query. A device may identify that the query relates to a field of expertise. A device may perform a search based on the query on an expert knowledge base vector space in the field of expertise. A device may identify at least one expert answer from the expert knowledge base vector space that is responsive to the query. A device may provide a response to the query, wherein the response includes the at least one expert answer.

20 Claims, 13 Drawing Sheets

(58) Field of Classification Search
  USPC ......................................................... 707/723
  See application file for complete search history.

(56)             References Cited

U.S. PATENT DOCUMENTS

| | | | |
|---|---|---|---|
| 2019/0347563 A1* | 11/2019 | Bruno .................... | G06N 5/022 |
| 2020/0227026 A1* | 7/2020 | Rajagopal ............. | G06F 16/244 |
| 2020/0294683 A1* | 9/2020 | Gutman .................. | H04L 67/12 |
| 2022/0391595 A1 | 12/2022 | Shevelev | |
| 2023/0028381 A1 | 1/2023 | Meyerzon | |
| 2024/0054360 A1* | 2/2024 | Zhou ...................... | G06N 5/022 |

OTHER PUBLICATIONS

Formica, et al., "A template-based approach for question answering over knowledge bases", Knowledge and Information Systems, vol. 66, Sep. 2, 2023, pp. 453-479.
Johnson, Ben., "Building an AI-powered question answering bot in 2 days", Retool, Jun. 21, 2023, 12 pages.

* cited by examiner

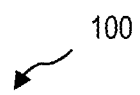
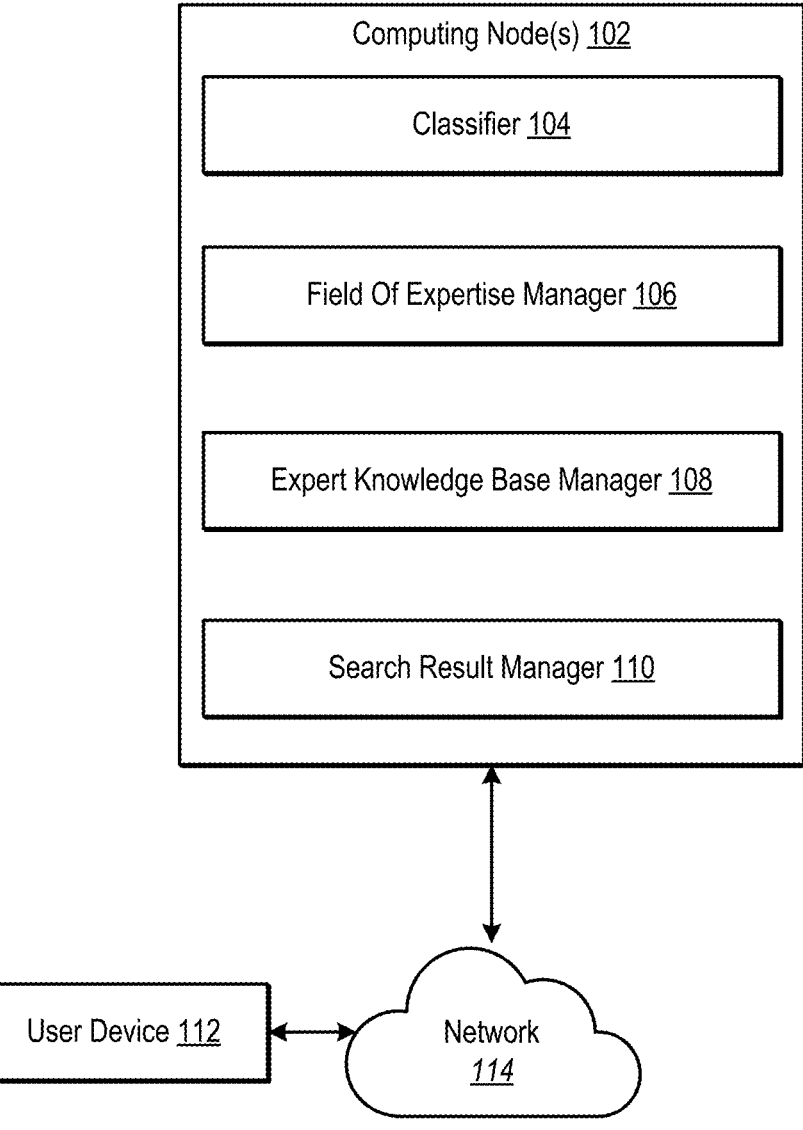
FIG. 1

300

Expert 324

Computing Node(s) 302

Classifier 304

Field Of Expertise Manager 306

Expert Knowledge Base Manager 308

User Device 312

Network 314

400

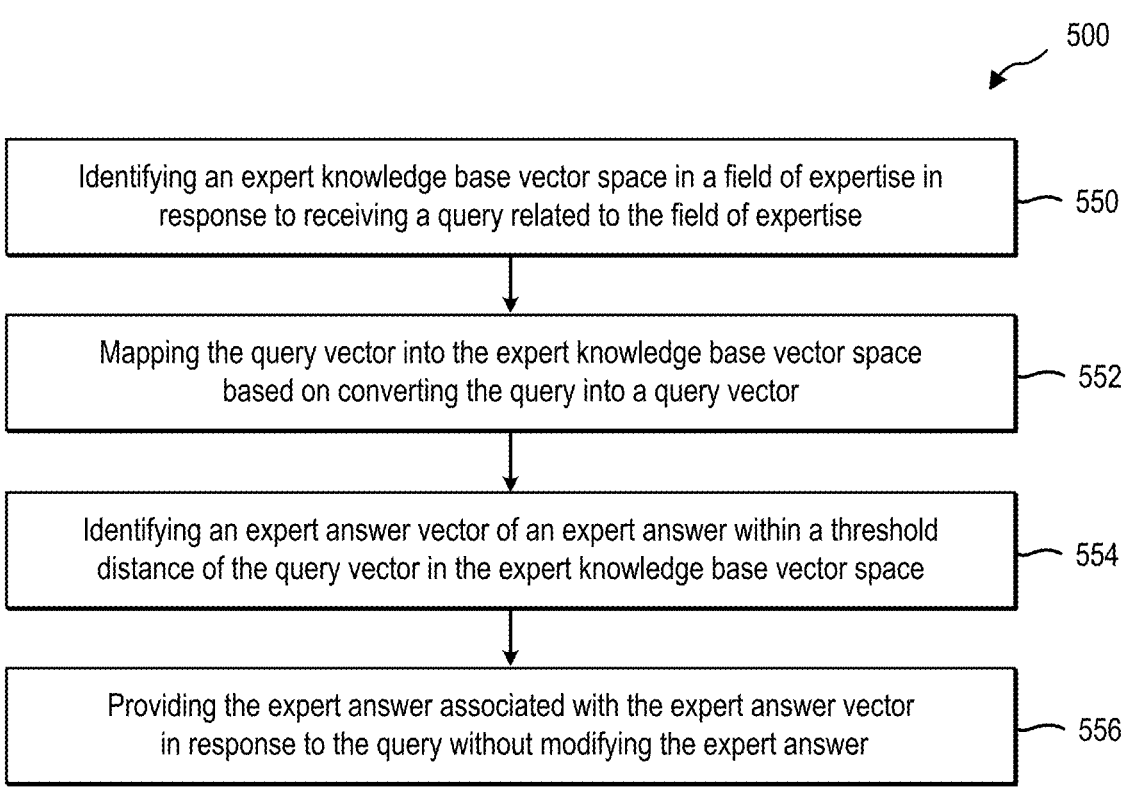

500

| | |
|---|---|
| Identifying an expert knowledge base vector space in a field of expertise in response to receiving a query related to the field of expertise | 550 |
| Mapping the query vector into the expert knowledge base vector space based on converting the query into a query vector | 552 |
| Identifying an expert answer vector of an expert answer within a threshold distance of the query vector in the expert knowledge base vector space | 554 |
| Providing the expert answer associated with the expert answer vector in response to the query without modifying the expert answer | 556 |

FIG. 5

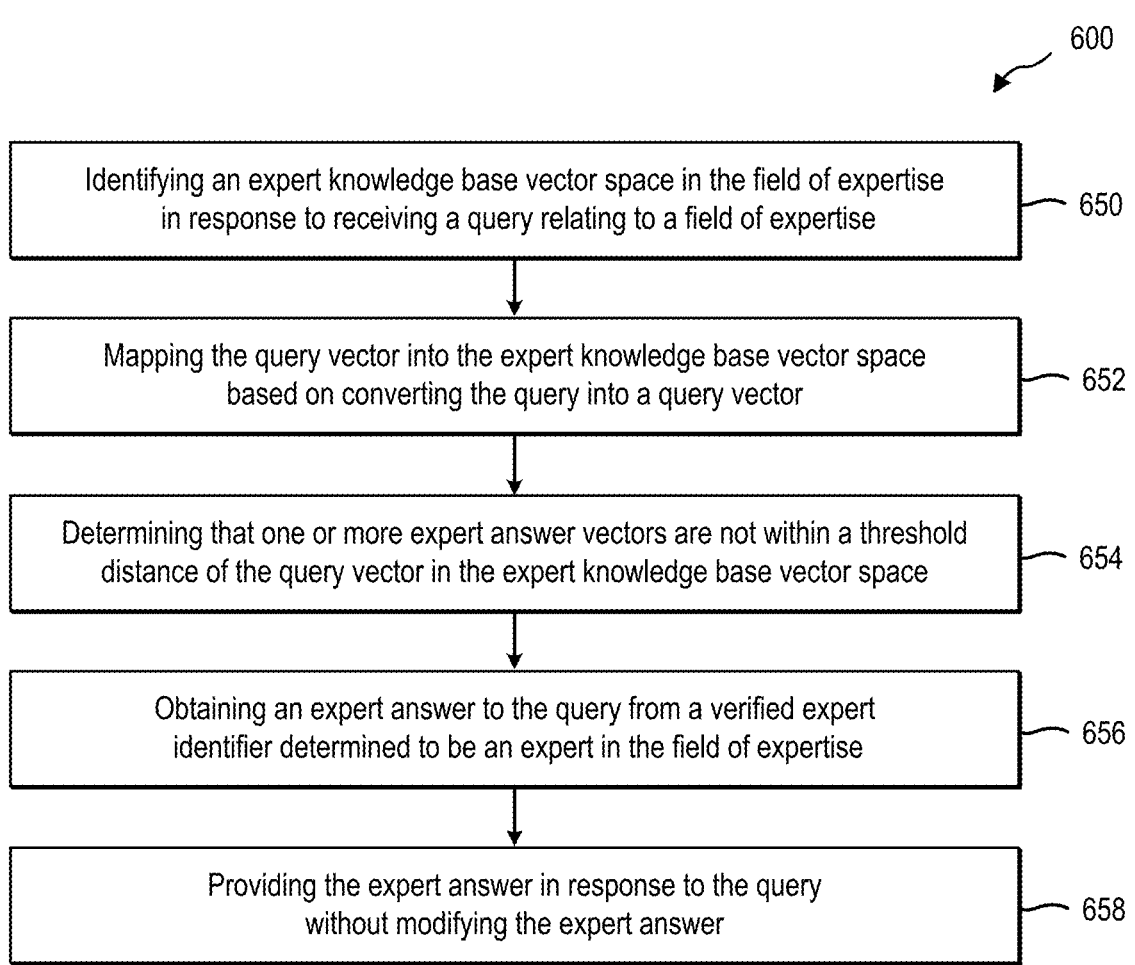

600

Identifying an expert knowledge base vector space in the field of expertise in response to receiving a query relating to a field of expertise — 650

Mapping the query vector into the expert knowledge base vector space based on converting the query into a query vector — 652

Determining that one or more expert answer vectors are not within a threshold distance of the query vector in the expert knowledge base vector space — 654

Obtaining an expert answer to the query from a verified expert identifier determined to be an expert in the field of expertise — 656

Providing the expert answer in response to the query without modifying the expert answer — 658

Figure 9:
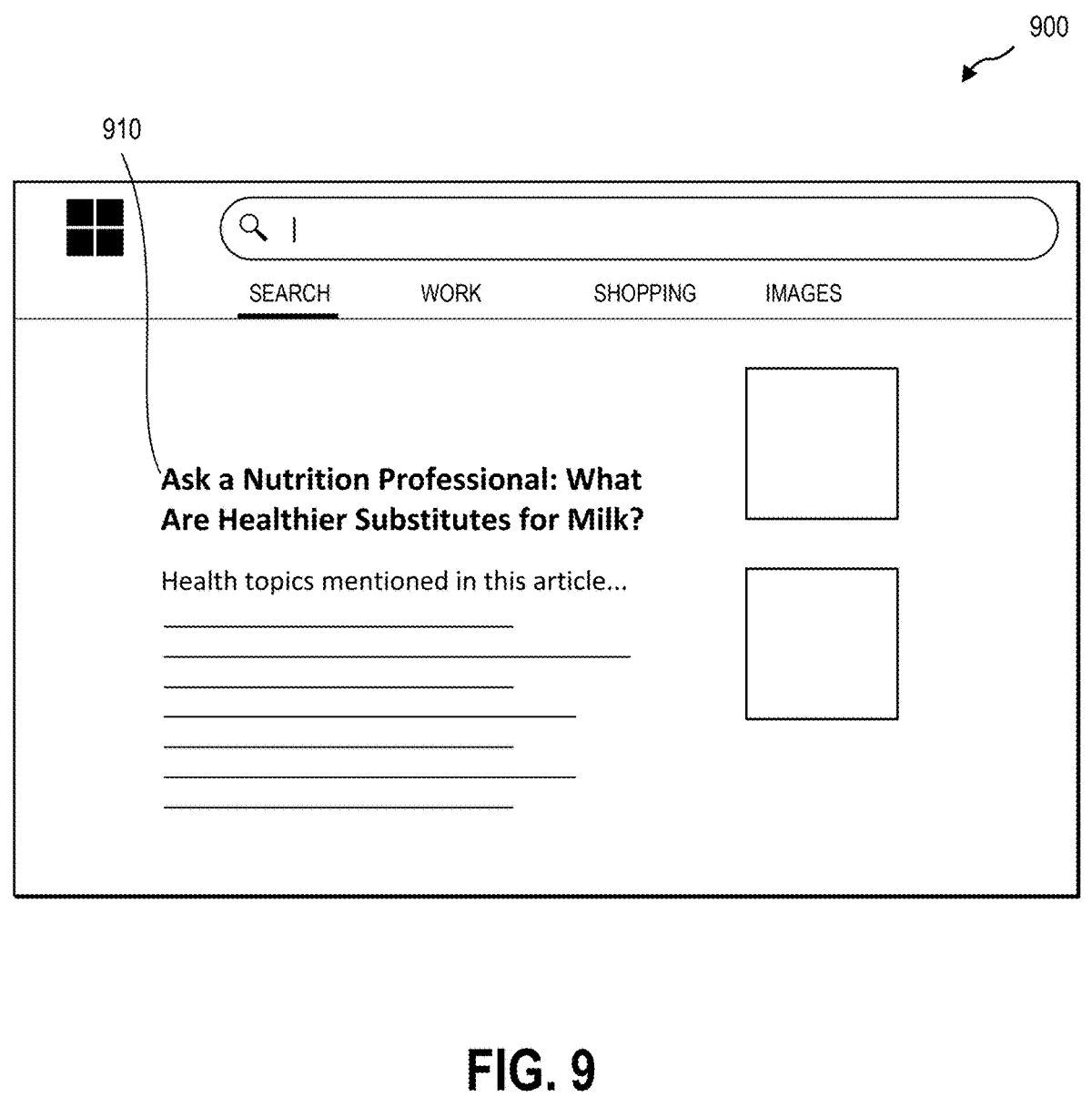

Ask a Nutrition Professional: What Are Healthier Substitutes for Milk?

Health topics mentioned in this article...

SEARCH          WORK          SHOPPING          IMAGES

1194

Copilot

Adult-onset asthma can indeed be more challenging and serious than childhood asthma. Let's explore why:

1. Causes and Symptoms:

> Triggers: While the exact cause of adult-onset asthma isn't always clear, several factors can contribute. These include respiratory infections, allergies, and exposure to airway irritants like smoke and mold.
>
> Symptoms: Adult-onset asthma presents similar symptoms to childhood asthma, such as chest tightness, difficulty breathing, wheezing, and a dry cough. However, in adults, these symptoms tend to be more persistent.

2. Severity:

> Persistent symptoms: Unlike childhood asthma, which often has intermittent symptoms, adult-onset asthma tends to persist. This persistence can lead to delays in diagnosis and treatment.
>
> Impaired lung function: Any delay in diagnosis and treatment can impair lung function, emphasizing the importance of seeking medical attention promptly if you suspect you have developed asthma.

3. Risk Factors:

> Childhood Asthma History: having childhood asthma increases the risk of a relapse in your 30s or 40s.
>
> Overweight or Obesity: Being overweight or obese, along with low activity and inflammation, contributes to the risk of adult onset asthma.

4. Additional Challenges:

🔍 Ask me anything...

FIG. 11

SYSTEMS AND METHODS FOR PROVIDING RELIABLE INFORMATION FOR QUERIES

CROSS REFERENCE TO RELATED APPLICATIONS

This application claims priority to IN Provisional Patent Application No. 202411013245, titled "SYSTEMS AND METHODS FOR PROVIDING RELIABLE INFORMATION FOR QUERIES," and filed Feb. 23, 2024, which is incorporated herein in its entirety by reference.

BACKGROUND

Users may use search engines and generative AI (artificial intelligence) chats for searching answers to their questions. Due to the nature of typical search engines, they may only provide various webpages as a result which have been indexed by web crawlers (also known as web spiders, or web bots) without verifying if the information in these webpages is accurate, true, up-to-date, and reliable. Hence, users are frequently subjected to misinformation, outdated, false, or inaccurate information. Deliberately spreading disinformation online with the purpose to mislead others or to advance a specific agenda is a commonly used tactic in digital warfare. Understanding and combating disinformation becomes crucial for everyday users as they try to make informed decisions based on the results they receive.

BRIEF SUMMARY

In some embodiments, a computer-implemented method for determining one or more reliable expert answer vectors in one or more expert knowledge base vector spaces is provided. The computer-implemented method includes in response to receiving a query relating to a field of expertise, identifying an expert knowledge base vector space in the field of expertise that includes answer vectors only from expert identifiers determined to be experts in the field of expertise. The computer-implemented method further includes based on converting the query into a query vector, mapping the query vector into the expert knowledge base vector space. The computer-implemented method further includes identifying an expert answer vector of an expert answer within a threshold distance of the query vector in the expert knowledge base vector space. The computer-implemented method further includes providing the expert answer associated with the expert answer vector in response to the query without modifying the expert answer.

In other embodiments, a computer-implemented method for determining one or more reliable expert answer vectors in one or more expert knowledge base vector spaces is provided. The computer-implemented method includes in response to receiving a query relating to a field of expertise, identifying an expert knowledge base vector space in the field of expertise that includes answer vectors only from expert identifiers determined to be experts in the field of expertise. The computer-implemented method further includes based on converting the query into a query vector, mapping the query vector into the expert knowledge base vector space. The computer-implemented method further includes determining that no expert answer vectors are within a threshold distance of the query vector in the expert knowledge base vector space. The computer-implemented method further includes obtaining an expert answer from a verified expert identifier determined to be expert in the field of expertise. The computer-implemented method further includes providing the expert answer in response to the query without modifying the expert answer.

In yet other embodiments, a system is provided. The system includes at least one processor and a non-transitory computer memory comprising instructions that, when executed by the at least one processor, cause the system to perform operations of: (i) in response to receiving a query relating to a field of expertise, identifying an expert knowledge base vector space in the field of expertise that includes answer vectors only from expert identifiers determined to be experts in the field of expertise, (ii) based on converting the query into a query vector, mapping the query vector into the expert knowledge base vector space, (iii) determining that no expert answer vectors are within a threshold distance of the query vector in the expert knowledge base vector space, (iv) obtaining an expert answer from a verified expert identifier determined to be experts in the field of expertise, and (v) providing the expert answer in response to the query without modifying the expert answer.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description that follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings.

FIG. 1 is a schematic representation of an environment for providing reliable expert answers.

FIG. 5 illustrates an example flowchart including a series of acts for providing reliable expert answers.

FIG. 6 illustrates an example flowchart including a series of acts for generating reliable expert answers.

FIG. 9 illustrates an example of utilizing an expert knowledge database in creating articles.

FIG. 11 illustrates an example of utilizing an expert's answers in chat queries.

DETAILED DESCRIPTION

Figure 2:
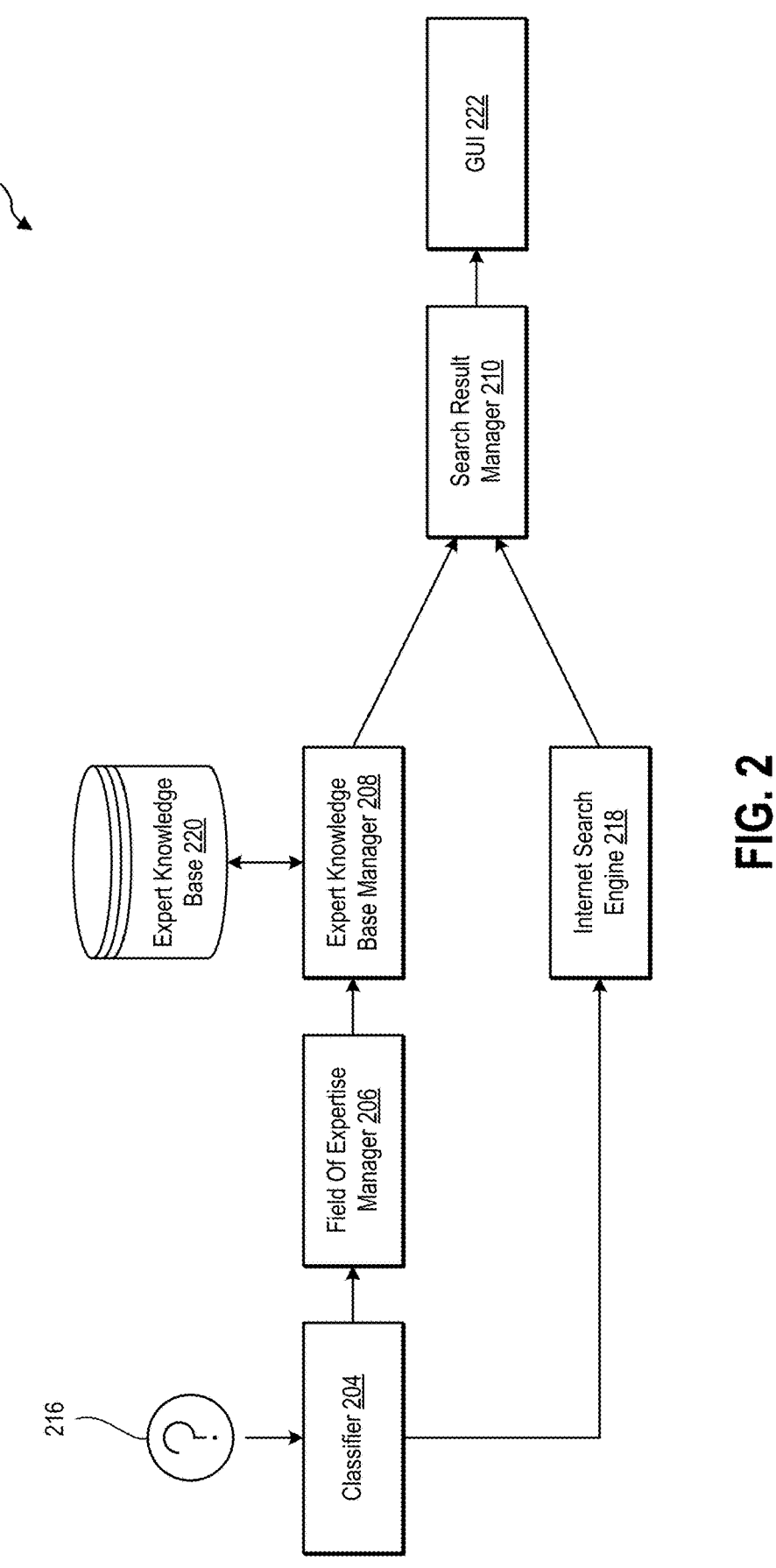
FIG. 2 illustrates an example implementation in which reliable information is provided on a query, according to at least one embodiment.

This disclosure generally relates to systems and methods for providing reliable expert answers to users who search for information using search engines, generative AI chatbots, etc.

The features and functionalities of the system(s) and methods described herein provide a number of advantages and benefits over conventional information search systems. For instance, one possible advantage of compiling a multi-dimensional expert knowledge base vector space and providing a result including an answer that has been stored in the expert knowledge base vector space, is that it provides a more reliable result to a query than with traditional search engines or generative AI models. In addition, a user may verify the reliability of the expert by reviewing their credentials, providing them more assurance regarding the expert answer received.

In addition, in some situations by having an expert knowledge base vector space, a need to send a query to an expert can be avoided if the query has already been answered by an expert and stored in the expert knowledge base vector space. This way, reliable information may be provided in response to a query in real time without the need to wait for an expert to answer a query. Additionally, by compiling the expert knowledge base vector space that may include millions of answer vectors including an answer, and by converting a query to a query vector that may be applied to the multidimensional knowledge base vector space to find nearby answer vectors, the expert knowledge base vector space provides a quick way of identifying answers that are responsive to the query, without any human involvement.

One possible advantage of enabling users to submit queries to one or more experts is that these additional expert answers may be used to update the expert knowledge base vector space in a dynamic and flexible way that improves the expert knowledge base vector space over time.

As illustrated by the foregoing discussion, the present disclosure utilizes a variety of terms to describe features and advantages of providing reliable information for queries. Additional detail is now provided regarding the meaning of such terms. For example, the term "query" refers to a question or a phrase that seeks to find an answer, guidance, solution, or explanation to a topic. For example, a query may ask "how to bake a cake," or it may include a phrase which does not define any intent or a question per se, for example, "Migraine symptoms."

For example, the term "expert knowledge base vector space" refers to a multidimensional structured repository of information and data that is organized to facilitate efficient analysis, retrieval, and sharing. The knowledge is typically represented in natural language using sentences which provide facts, rules, and relationships. In some embodiments, the information and data stored in the expert knowledge base vector space (e.g., answer vectors) includes answers from experts, synonyms for terms used, and a plurality of questions related to an answer. The plurality of questions related to the answer may be queries made by users ahead of time, or they may be queries generated by a language model to proximate various or different ways to request the answer stored. Typically, a single expert knowledge base vector space includes information related to one field of expertise, such as taxation, legal, health, cooking, construction engineering, etc. In some embodiments, a single expert knowledge base vector space may include information from two or more fields of expertise, such as health and medical, or nutrition, health, and medical. In some embodiments, an expert knowledge base vector space may capture knowledge in multimedia format, such as images, animation, videos, audio, or a combination thereof. Even though some embodiments described below describe the implementation in the context of "Health," the systems and methods described herein are not limited to "Health" but could be implemented with any field of expertise.

FIG. 1 is a schematic representation of an environment 100 for providing reliable expert answers. In some embodiments, the environment 100 includes one or more computing node(s) 102 for providing results to a query sent by a user device 112. The user device 112 may be a mobile device, wearable device, a table, a laptop, a computer, any other type of electronic device, or a combination thereof. In some embodiments, the electronic device is partially under a control of a user. For example, the device may be owned and controlled by the user. In some embodiments, the device is not under control of a user. For example, the user may operate an electronic device that is owned by a corporation and the operations performed on the device are controlled by the corporation. The user device 112 may submit a query to the one or more computing node(s) 102 over a network 114. The network 114 may be any type of network. For example, the network 114 may be a local area network (LAN), a wide area network (WAN), a Wi-Fi network, a cellular network, any other network, and combinations thereof.

The one or more computing node(s) 102 may further include a classifier 104. In some embodiments, the classifier 104 is configured to identify a classification for the query received. For example, if the query is "What are some common foods that include vitamin C" the classifier 104 may classify the query as "Health." The system further includes a field of expertise manager 106. In some embodiments, the field of expertise manager 106 is configured to compare the classification, provided by the classifier 104, into a field of expertise. The field of expertise includes those fields where an expert knowledge base vector space has been established. For example, if an expert knowledge base vector space has been created in the health field, and the query relates to health, then the field of expertise manager 106 triggers a search to the health expert knowledge base vector space.

In some embodiments, two or more expert knowledge base vector spaces have been established on two or more fields of expertise, and if the query relates to one of them, a search may be carried out in the identified expert knowledge base vector space in the field of expertise the query relates to. For example, a health expert knowledge base vector space, a taxation expert knowledge base vector space, and a cooking expert knowledge base vector spaces have been established. A query is received that is classified as "Taxation." A field of expertise for the query is then determined by identifying a classification for the query where the classification is assigned to the field of expertise. The system may further identify an expert knowledge base vector space in the field of expertise by using the field of expertise to select the expert knowledge base vector spaces from a set of expert knowledge base vector spaces corresponding to different expert fields. The classification of the query ("Taxation") can then be mapped to the taxation field of expertise, and a search may be performed in the taxation expert knowledge base vector space based on the query. In some embodiments, two or more closely related classifications may be combined into a single expert knowledge base vector space. For example, a single expert knowledge base vector space may cover both "Medical" and "Health" expertise, as those are closely related topics. For example, a doctor may provide medical related answers, such as "What is a weight loss surgery," as well as health related questions, such as "What are the healthier substitutes for milk."

The system further includes an expert knowledge base manager 108. In some embodiments, the expert knowledge base manager 108 is configured to convert the query to a query vector with set of values and to apply the query vector to the multidimensional expert knowledge base vector space to identify nearby answer vectors (e.g., answer vector embeddings) that are responsive to the query. For example, a query regarding "migraine" may be closely mapped to an answer in the multidimensional expert knowledge base vector space that talks about migraines.

In some embodiments, when a plurality of expert answer vectors of expert answers are closely mapped to the query, the plurality of expert answer vectors are ranked and one or more expert answer vectors (e.g., a subset of the plurality of expert answer vectors) having the highest ranking will be provided in the response to the query. In some embodiments, the plurality of expert answer vectors are ranked based on one or more expert attributes, such as a location of an expert, a number of years practiced as an expert in the field of expertise, an amount of elapsed time since the expert provided the expert answer, or a combination thereof. In some embodiments, the expert answer vectors are ranked based on a location of the expert. For example, if the user making the query and the expert providing the answer are both based in the same country, same state, same jurisdiction, or same district, the expert's answer may be ranked higher than another expert's answer who is not based in the same country, same state, same jurisdiction, or same district as the user who made the query. In some embodiments, the expert answer vectors may be ranked based on the number of years of practice as an expert. For example, an expert who has been an expert in the field for 20 years may be ranked higher than an expert who has practiced for less than five years. In some embodiments, expert answer vectors are ranked based on the elapsed time that has passed since the expert provided the answer. For example, if the answer was provided five years ago, the answer may be ranked lower than if the answer was submitted a month ago. In some embodiments, users may provide feedback, or give "likes" or "thumbs up" for the answers that an expert has provided. In some embodiments, these "likes" may be used to rank the expert answer vectors. For example, if Expert A's answer has received a hundred likes, and Expert B's answer has received 10 likes, the expert A's answer may be ranked higher than expert B's answer. In some embodiments, expert answer vectors are ranked based on at least one or more of a location of the expert, the number of years of practice as an expert, how long ago the answer was provided, how many "likes" the expert answer has received, or a combination thereof.

The environment 100 may further include a search result manager 110. In some embodiments, the search result manager 110 may provide a response to the query. For example, the search result manager 110 may provide a response that includes the at least one expert answer associated with an expert answer vector to the user device 112. In some embodiments, only one expert answer is provided. In some embodiments, two or more expert answers are provided in the response. In one or more embodiments, providing the response causes the at least one expert answer to be displayed to a user. In some embodiments, the at least one expert answer is provided together with a normal search result. For example, the reliable expert answer may be displayed at the top of the search result page followed by the normal search query performed by a traditional search engine.

FIG. 2 illustrates an example implementation 200 in which reliable information is provided on a query, according to at least one embodiment. In some embodiments, a query 216 may be generated by a user on a graphical user interface (GUI), such as on the user device 112, as shown in FIG. 1. In some embodiments, the GUI is a search interface, such as Bing or Google. In some embodiments, the GUI is a chat interface, such as Copilot, chat GTP, etc. In some embodiments, the GUI is an application interface. For example, the GUI is a voice activated interface, such as Alexa, Siri, Cortana, Bing, an AI agent, or other voice activated interface.

A classifier 204, such as the classifier 104 of FIG. 1, is configured to identify a classification for the query 216 received. In some embodiments, the classification for the query includes identifying one or more characteristics of the query. In some embodiments, one possible characteristic of the query includes one or more keywords in the query. For example, if the query 216 is "What are some common tax deductions" the classifier 204 may classify the query as "Taxation" based on the keyword "tax." In some embodiments, the keyword corresponds to an assigned keyword associated with an expert knowledge base vector space. For example, the keyword "tax" may be associated with a "Taxation" expert knowledge base vector space. In some embodiments, characteristics of the query include a query complexity score, a vocabulary score, query length, prior queries, subsequent queries, or a combination thereof. For example, the query complexity score may include complex sentence structures, such as if-statements, prepositional phrases, or proper capitalization and/or punctuation.

In some embodiments, the vocabulary score is based on a grade level test, such as Fleish-Kinkaid reading ease score, Fleish-Kinkaid grade level test, or an average number of syllables in the query. For example, the average number of syllables in the query may be greater than 1. In another example, the average number of syllables in the query may be greater than 1.5. In yet another example, the average number of syllables in the query may be greater than 2. In some embodiments, the query length is greater than 30/40/50/70/100 characters.

In some embodiments, the classification for the query is assigned to one or more fields of expertise. Furthermore, a field of expertise can be associated with one or more expert knowledge base vector spaces. In some embodiments, assigning the one or more keywords to a classification includes identifying synonyms for the one or more keywords. In some embodiments, a field of expertise for the query is determined by identifying a classification for the query where the classification is assigned to the field of expertise. The system may further identify an expert knowledge base vector space in the field of expertise by using the field of expertise to select the expert knowledge base vector spaces from a set of expert knowledge base vector spaces corresponding to different expert fields.

In some embodiments, the classifier then provides the classification to an internet search engine 218 for performing a traditional search query. The classifier 204 also provides the classification to a field of expertise manager 206. The field of expertise manager 206 compares the classification received from the classifier 204, into assigned keywords associated with the field of expertise. The field of expertise includes those fields where an expert knowledge base vector space has been established. For example, if an expert knowledge base vector space has been created in the health field, and the query is classified as "Health," then the field of expertise manager 206 triggers a search to the health expert knowledge base vector space. On the other hand, if the query is classified as "legal," and there is no expert knowledge base vector space built on the legal field of expertise, then the field of expertise manager 206 does not provide the query to any expert knowledge base vector space, and only the traditional search is performed with the internet search engine 218.

When the field of expertise manager 206 finds that the query relates to an expert knowledge base vector space, the field of expertise manager 206 provides the query to an expert knowledge base manager 208. In some embodiments, the expert knowledge base manager 208 converts the query to a query vector (e.g., a query vector embedding) with a set of values and applies the query vector to the expert knowledge base vector space 220 to identify nearby answers that are responsive to the query vector. In particular, by applying the query vector to the expert knowledge base vector space 220, the location of the query vector and the information vector proximate (e.g., distance) to the query vector in the knowledge base vector space are scored based on the distance of the two vectors. For example, if the query vector and the answer vector have a score of 0.8 (on a scale of zero to one) or above, the answer is determined to be relevant to the query and it is returned to the expert knowledge base manager 208. If, for example, the query vector and the answer vector have a score below 0.8 the answer is determined to be not relevant to the query and the answer is not provided to the expert knowledge base manager 208. In some embodiments, the threshold distance in determining if the answer is relevant or not may be above or below 0.8. For example, in some embodiments, the threshold distance is 0.85, 0.9, or 0.95. In some embodiments, the threshold distance is 0.65, 0.7, or 0.75. For example, a query regarding "migraine" may be closely mapped to an answer in the multidimensional expert knowledge base vector space that talks about migraines.

In some embodiments, when a plurality of expert answer vectors are closely mapped to the query vector (e.g., a plurality of expert answer vectors are above the threshold distance), the plurality of expert answer vectors are ranked and one or more expert answers associated with the expert answer vectors having the highest ranking will be provided in the response to the query. In some embodiments, the highest ranking expert answer vector is not the closest expert answer vector to the query vector. For example, the plurality of expert answer vectors closely mapped to the query vector includes one or more expert answer vectors with a shorter distance to the query vector than the expert answer vector provided as a response to the user query.

In some embodiments, the plurality of expert answer vectors is ranked based on one or more expert attributes of the expert identifiers associated with each of the plurality of expert answer vectors. For example, the one or more expert attributes include a location of an expert, a number of years practiced as an expert in the field of expertise, an amount of elapsed time since the expert provided the expert answer, or a combination thereof. In some embodiments, the expert answer vectors are ranked based on a location of the expert. For example, if the user making the query and the expert providing the answer are both based in the same country, same state, same jurisdiction, or same district, the expert's answer may be ranked higher than another expert's answer who is not based in the same country, same state, same jurisdiction, or same district as the user who made the query. In some embodiments, the expert answer vectors may be ranked based on the number of years practiced as an expert. For example, an expert who has been an expert in the field for 20 years may be ranked higher than an expert who has practiced for less than five years. In some embodiments, expert answer vectors are ranked based on how long ago the answer was provided. For example, if the answer was provided five years ago, the answer may be ranked lower than if the answer was submitted a month ago. In some embodiments, users may provide feedback, or give "likes" or "thumbs up" for the answers that an expert has provided. In some embodiments, these "likes" may be used to rank the expert's answers. For example, if expert A's answer has received a hundred likes, and expert B's answer has received 10 likes, expert A's answer may be ranked higher than expert B's answer. In some embodiments, expert answer vectors are ranked based on at least one or more of a location of the expert, number of years practiced as an expert, how long ago the answer was provided, how many "likes" the expert answer has received, or a combination thereof. In some embodiments, each of the one or more ranking variables may be weighted differently. For example, the expert's location may be weighted more than the number of "likes" their answer has received.

The expert knowledge base manager 208 then provides the one or more expert answers associated with the expert answer vectors to a search result manager 210. The search result manager 210 may provide the response to the query. For example, the search result manager 210 may provide a response that includes the at least one expert answer to the user device and causes them to be displayed on a GUI 222. In some embodiments, only one expert answer is provided. In some embodiments, two or more expert answers are provided in the response. In some embodiments, the at least one expert answer is provided together with normal search results, received from the internet search engine 218. For example, the reliable expert answer may be displayed at the top of the search result page of the GUI 222 followed by the normal search query performed by the internet search engine 218.

Figure 3:
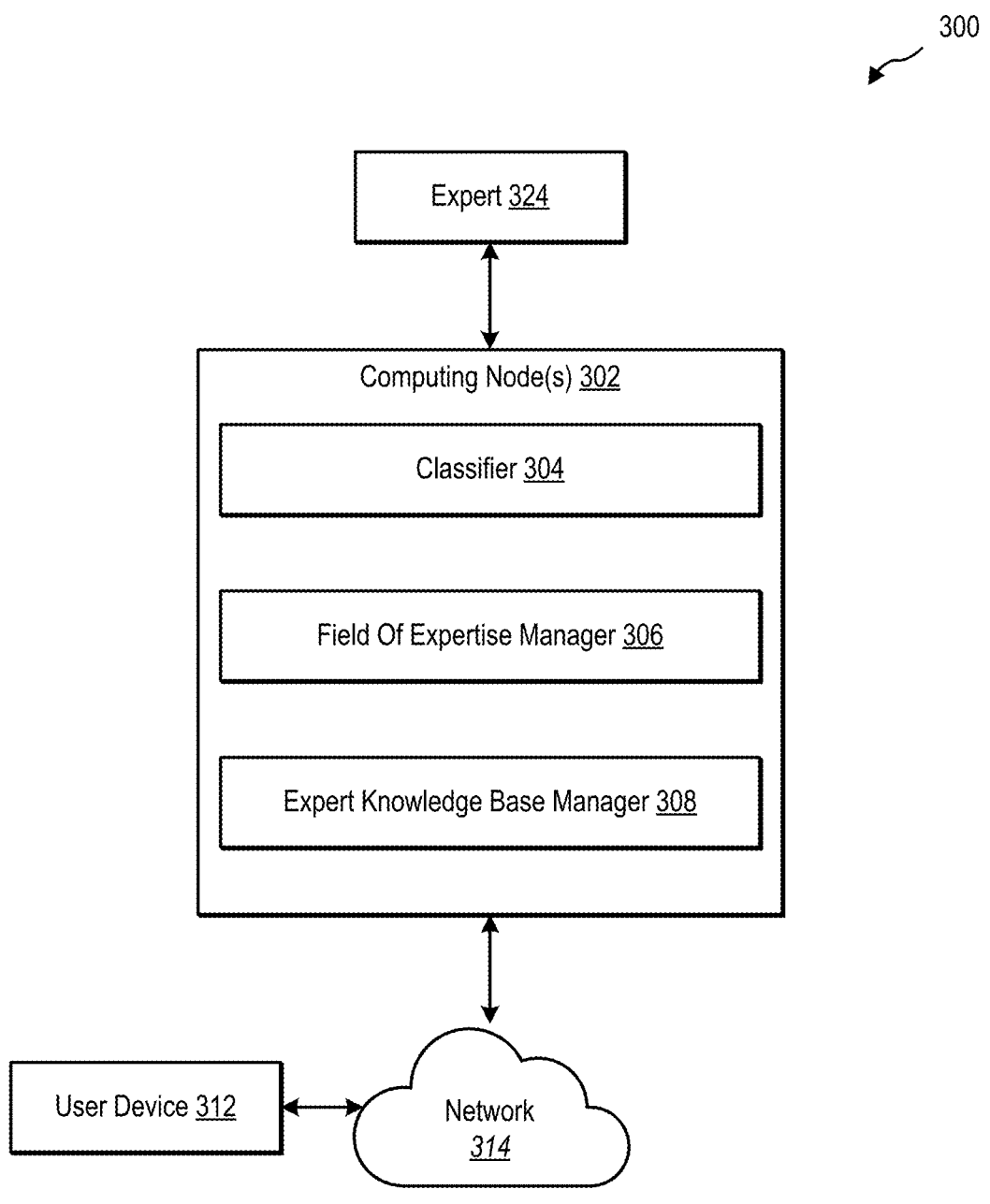
FIG. 3 is a schematic representation of an environment for generating reliable expert answers.

FIG. 3 is a schematic representation of an environment 300 for generating reliable expert answers. The environment includes a user device 312, such as the user device 112 of FIG. 1 and/or user device 312 of FIG. 3. The user device is able to provide a query to one or more computing node(s) 302 via a network 314, such as the network 114 of FIG. 1.

The one or more computing node(s) 302 may further include a classifier 304. In some embodiments, the classifier 304 is configured to identify a classification for the query received. For example, if the query is "What are some common foods that include vitamin C" the classifier 304 may classify the query as "Health." The system further includes a field of expertise manager 306. In some embodiments, the field of expertise manager 306 is configured to compare the classification, provided by the classifier 304, into a field of expertise. The field of expertise includes those fields where an expert knowledge base vector space has been established. For example, if an expert knowledge base vector space has been created in the health field, and the query relates to health, then the field of expertise manager 306 triggers a search to the health expert knowledge base vector space.

In some embodiments, two or more expert knowledge base vector spaces have been established, and if the query relates to one of them, a search may be carried out in the identified expert knowledge base vector space in the field of expertise the query relates to. For example, a health expert knowledge base vector space, a taxation expert knowledge base vector space, and a cooking expert knowledge base vector space have been established. A query is received that is classified as "Taxation." The classification of the query "Taxation" can then be mapped to the taxation field of expertise, and a search may be performed in the taxation expert knowledge base vector space based on the query. In some embodiments, two or more closely related classifications may be combined into a single expert knowledge base vector space. For example, a single expert knowledge base vector space may cover both "Medical" and "Health" expertise, as those are closely related topics. For example, a doctor may provide medical related answers, such as "What is a weight loss surgery," as well as health related questions, such as "What are the healthier substitutes of milk."

The system further includes an expert knowledge base manager 308. In some embodiments, the expert knowledge base manager 308 is configured to convert the query to a query vector with a set of values and to apply the query vector to the multidimensional expert knowledge base vector space to identify nearby answers that are responsive to the query. For example, a query regarding "migraine" may be closely mapped to an answer in the multidimensional expert knowledge base vector space that talks about migraines.

In some embodiments, the expert knowledge base manager 308 detects that there is no expert answer vector in the expert knowledge base vector space that is responsive to the query. For example, when the query vector is applied to the expert knowledge base vector space, a score between the query vector location and any information vector (e.g., expert answer vector) proximate to the query vector in the knowledge base vector space has a score below 0.8 (e.g., the threshold distance). The expert knowledge base manager 308 may then determine that there are no answers relevant to this query. In some embodiments, the threshold distance when an answer is determined to be not relevant for the query is above 0.8 or below 0.8. For example, in some embodiments, the threshold distance score is below 0.6, below 0.7, or below 0.9.

When the expert knowledge base manager 308 determines that there is no expert answer vector in the expert knowledge base vector space that is responsive to the query, the expert knowledge base manager 308 may obtain an expert answer by transmitting the query to one or more verified experts 324 in the field of expertise. In some embodiments, an expert is verified by the system by providing verifiable credentials on their expertise. For example, the expert may provide their diploma, current license to practice in the field of expertise, registration number, publications, etc. In some embodiments, once the expert's expertise is verified, the system may also verify that the expert is who they say they are and verify their identity with an identification card against the expert credentials provided earlier. Once an expert is verified, an expert identifier may be assigned to the expert and each expert answer they provide. For example, the expert knowledge base vector space may store the answer together with the expert identifier to identify which expert among the plurality of experts provided the specific answer.

In some embodiments, in obtaining an expert answer the system identifies one or more verified expert identifiers within the field of expertise and selects the verified expert identifier from the one or more verified expert identifiers based on the location of the verified expert identifier in relation to a location of a user identifier of a user of the query. In some embodiments, obtaining an expert answer the system identifies one or more verified expert identifiers within the field of expertise and selects the verified expert identifier from the one or more verified expert identifiers based on one or more expert attributes of the verified expert identifier. For example, the one or more verified expert identifiers within the field of expertise may be ranked based on one or more expert attributes, such as the location of an expert, the number of years practiced as an expert in the field of expertise, an amount of elapsed time since the expert provided the expert answer, or a combination thereof. In some embodiments, obtaining the expert answer includes sending the query to one or more of the highest ranked expert identifiers associated with an expert. In some embodiments, the expert knowledge base manager 308 receives one or more answers from the one or more verified experts 324 and stores them in the expert knowledge base vector space as an answer vector embedding. This way, the expert knowledge base vector space may be updated with new information as needed.

The expert answer may take several hours or even days to be received and updated to the expert knowledge base vector space as the expert answer vector. In some embodiments, expert answer vector is generated by encoding the expert answer upon obtaining the expert answer. The expert answer vector may then be stored within the expert knowledge base vector space. In some embodiments, the expert answer vector is stored with the expert knowledge base vector space if it is determined that the expert answer vector is within the threshold distance to the query vector within the expert knowledge base vector space. In some embodiments, if the expert answer vector is not within the threshold distance to the query vector within the expert knowledge base vector space, the expert answer vector is not stored within the expert knowledge base vector space. In some embodiments, when the expert answer is received, a notification may be provided to the user identifier that submitted the query that the expert answer is available for viewing. For example, a notification may be delivered by email, by web browser, or by an application.

In some instances, certain subject matters within the field of expertise may have been intentionally carved out (excluded, and/or prohibited) from the expert knowledge base vector space. For example, in some countries providing guidance, or information regarding different medicines may be illegal. In another example, topics such as teen pregnancies or abortions may be a sensitive subject that are intentionally left out from a "health" or "medical" expert knowledge base vector space. In another example, eating or cooking shark fins may be a controversial subject, and responses related to cooking them may be intentionally carved out from the expert knowledge base vector space. In some embodiments, the expert knowledge base manager 308 may be configured to perform a preprocessing for the query to be submitted to the experts, as well as for the answer received from the experts to prevent storing information that is intentionally carved out from the field of expertise for the expert knowledge base vector space. In some embodiments, when the expert answer is received, the system identifies that the expert answer does not relate to one or more excluded (e.g., prohibited) subject matters by determining that the expert answer is not prohibited based on a location of a user. For example, if the expert answer provides a recommendation for medicine, but providing medicine recommendations is illegal on the location of the user, the system may not provide the expert answer in response to the query. In some embodiments, if the system determines that the expert answer is not prohibited based on a location of a user, the expert answer is stored as an expert answer vector to the expert knowledge base vector space.

In some embodiments, when the expert knowledge base manager 308 determines that there are no expert answer vectors to the query vector, an option is provided to the user to send the query to one or more verified experts. In some embodiments, obtaining the expert answer includes determining that the query does not relate to one or more excluded subject matters that are prohibited based on the geographic location of a user identifier of a user.

Figure 4:
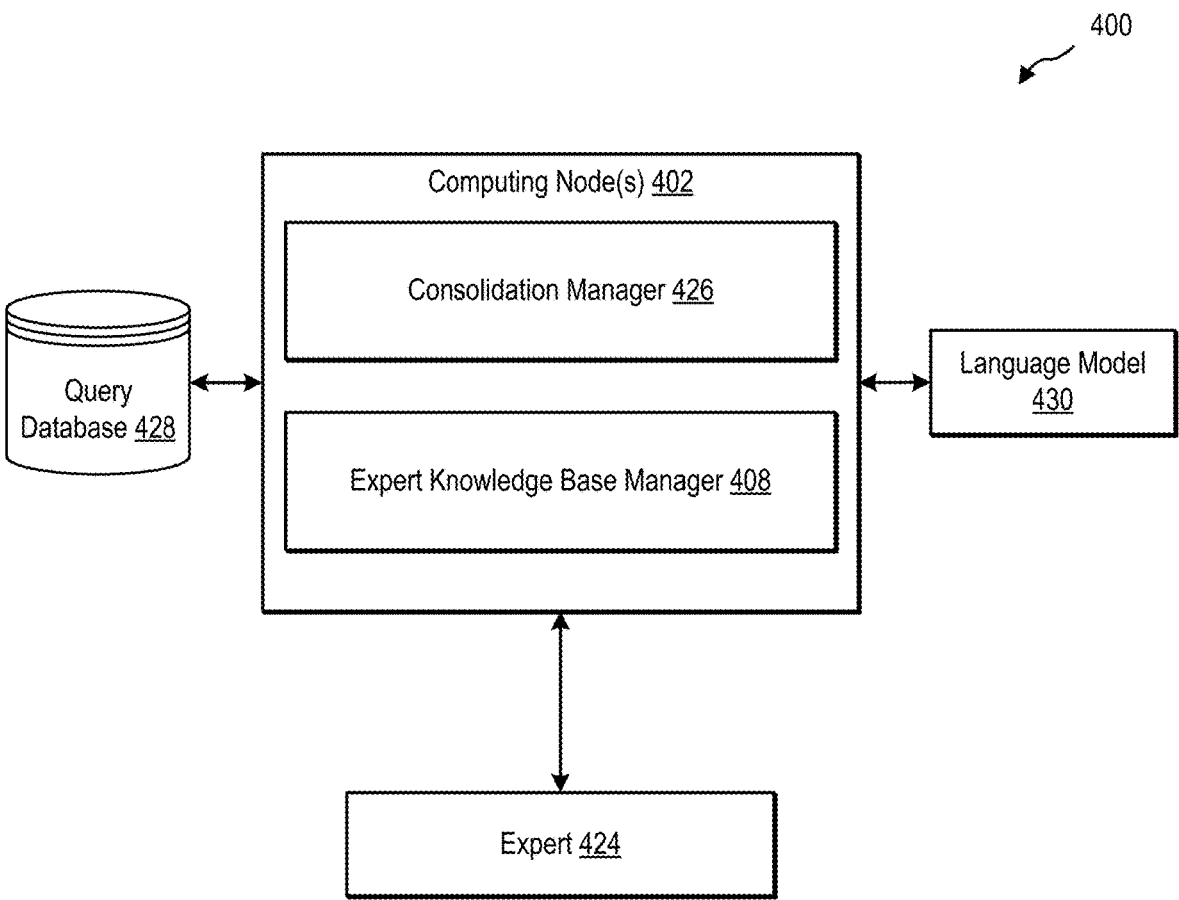
FIG. 4 is a schematic representation of an environment for creating an expert knowledge base vector space.

FIG. 4 is a schematic representation of an environment 400 for creating an expert knowledge base vector space. The environment 400 includes a query database 428, one or more computing nodes 402, and a language model 430. The query database 428 is configured to collect a plurality of queries relating to a field of expertise. For example, a trigger may be created on a search engine to store all queries related to taxation in the query database 428. In some embodiments, collecting the plurality of queries further includes identifying a classification for the plurality of queries and wherein the classification matches or is similar to the field of expertise. In some embodiments, when identifying the classification for the plurality of queries further includes identifying one or more keywords in the plurality of queries. In some embodiments, the one or more keywords are assigned to the expert knowledge base vector space.

The one or more computing nodes 402 further include a consolidation manager 426, and an expert knowledge base manager 408. The consolidation manager 426 is configured to consolidate multiple queries from the plurality of queries relating to a field of expertise including the query stored in the query database 428 into a single query. For example, the queries made by a plurality of users may include many different ways to search for particular information, but for which a single answer would be a correct answer for all the subset of queries. In some embodiments, the multiple queries are delivered to a language model 430, and the language model 430 is configured to analyze the multiple queries and to provide a single query that covers all the multiple queries. In some embodiments, the plurality of queries in the query database 428 are provided to the language model 430, and the language model 430 is configured to divide the plurality of queries into a subset of queries and to provide a single query that covers the subset of queries.

In some embodiments, the consolidation manager 426 is configured to provide the single query to one or more verified experts 424 having an expert identifier. In some embodiments, the single query is submitted to a verified expert identifier determined to be an expert in the field of expertise. In response to submitting the single query to the verified expert identifier, an answer may be received from the verified expert identifier that includes the expert answer. The one or more experts may be selected based on their specific expertise in the field of expertise. For example, in some embodiments, it is identified that the subset of queries relates to a subfield in the field of expertise and that the one or more experts are experts in the subfield in the field of expertise. For example, in case a subset of queries relates to pregnancy, the single question may be delivered to doctors who have specialized in obstetrics and gynecology (OBG). In some embodiments, the field of expertise for the query is determined based on identifying a classification for the query where the classification is assigned to the field of expertise. In some embodiments, identifying the expert knowledge base vector space in the field of expertise includes using the field of expertise to select the expert knowledge base vector space from a set of expert knowledge base vector spaces corresponding to different expertise fields. In some embodiments, identifying the classification for the query is based on identifying a keyword within the query that corresponds to an assigned keyword associated with the expert knowledge base vector space. In some embodiments, identifying the classification for the query is based on a query complexity score, a vocabulary score, a query length, a prior query, or a combination thereof.

In some embodiments, the expert knowledge base manager 408 receives the one or more expert answers from one or more verified experts and stores them in the expert knowledge base vector space as answer vectors. In some embodiments, both the single query and the subset of queries of the plurality of queries are also stored together with the one or more expert answers to the expert knowledge base vector space.

Turning now to FIG. 5, this figure illustrates an example flowchart including a series of acts for implementing features and functionalities described herein. In particular, FIG. 5 illustrates a series of acts related to providing reliable expert answers. While FIG. 5 illustrates acts according to one or more embodiments, alternative embodiments may omit, add, reorder, and/or modify any of the acts shown in FIG. 5. The acts of FIG. 5 may be performed as part of a computer-implemented method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

As shown in FIG. 5, the series of acts 500 includes an act 550 of identifying an expert knowledge base vector space in a field of expertise in response to receiving a query related to the field of expertise. In some embodiments, expert knowledge base vector space may include answer vectors only from expert identifiers determined to be experts in the field of expertise.

As further shown, the series of acts 500 further includes an act 552 of mapping the query vector into the expert knowledge base vector space based on converting the query into a query vector. As further shown, the series of acts 500 further includes an act 554 of identifying an expert answer vector of an expert answer within a threshold distance of the query vector in the expert knowledge base vector space. As further shown, the series of acts 500 further includes an act 556 of providing the expert answer associated with the expert answer vector in response to the query without modifying the expert answer.

Turning now to FIG. 6, this figure illustrates an example flowchart including a series of acts for implementing features and functionalities described herein. In particular, FIG. 6 illustrates a series of acts related to generating a reliable expert answer. While FIG. 6 illustrates acts according to one or more embodiments, alternative embodiments may omit, add to reorder, and/or modify any of the acts shown in FIG.

6. The acts of FIG. 6 may be performed as part of a computer-implemented method. Alternatively, a non-transitory computer-readable medium can include instructions thereon that, when executed by one or more processors, cause a server device and/or client device to perform the acts of FIG. 6. In still further embodiments, a system can perform the acts of FIG. 6.

As shown in FIG. 6, the series of acts 600 includes an act 650 of identifying an expert knowledge base vector space in the field of expertise in response to receiving a query relating to a field of expertise. In some embodiments, the expert knowledge base vector space includes answer vectors only from expert identifiers determined to be experts in the field of expertise.

As further shown, the series of acts 600 further includes an act 652 of mapping the query vector into the expert knowledge base vector space based on converting the query into a query vector. As further shown, the series of acts 600 further includes an act 654 of determining that one or more expert answer vectors are not within a threshold distance of the query vector in the expert knowledge base vector space. As further shown, the series of acts 600 further includes an act 656 of obtaining an expert answer to the query from a verified expert identifier determined to be an expert in the field of expertise. As further shown, the series of acts 600 further includes an act 658 of providing the expert answer in response to the query without modifying the expert answer.

Figure 7:
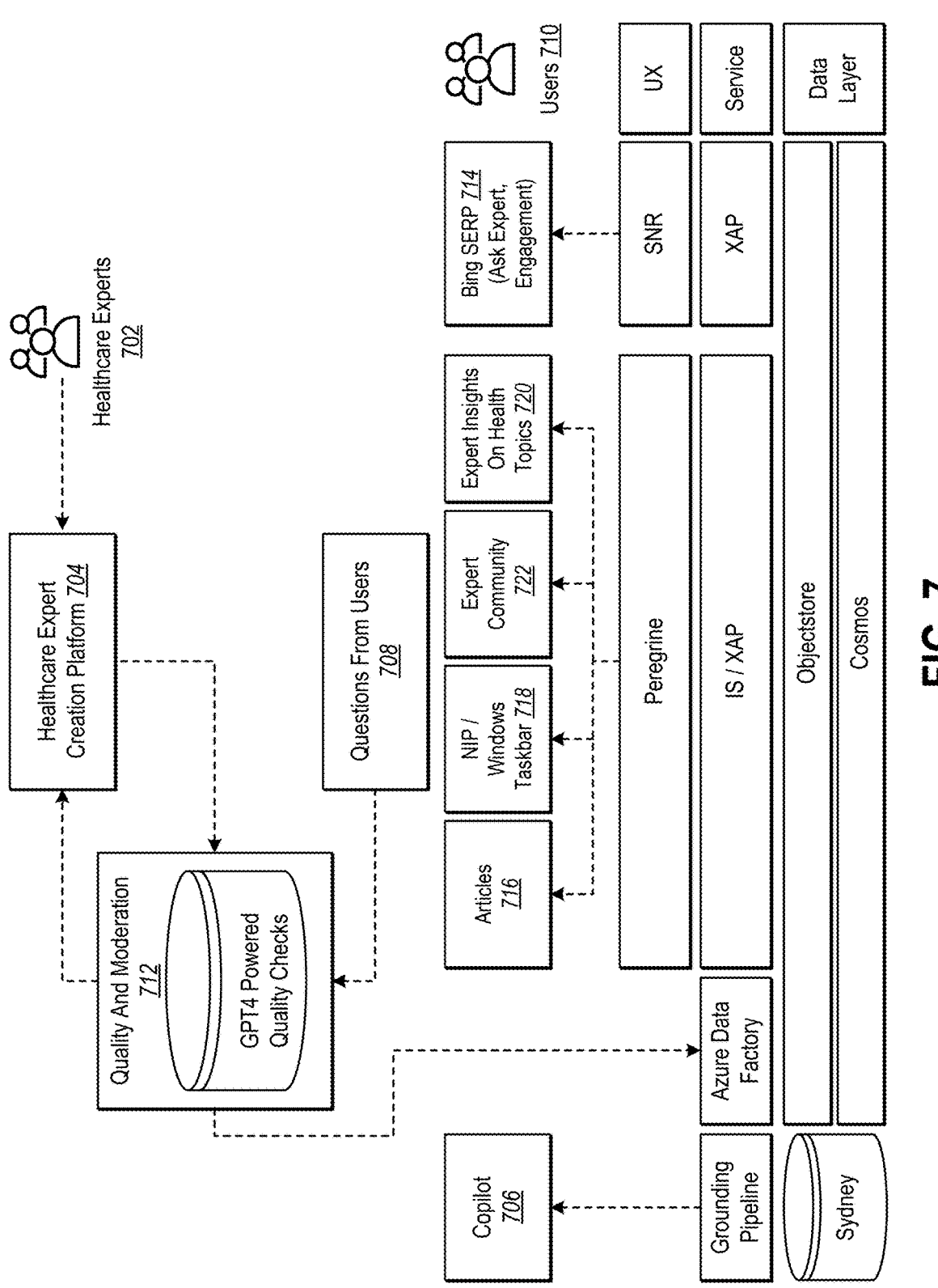
FIG. 7 illustrates an architecture of implementing features and functionalities described herein.

FIG. 7 illustrates an architecture of implementing features and functionalities described herein. Even though the example shown in FIG. 7 is explained in relation to healthcare, similar architecture may be applied to other areas of expertise as well. In some embodiments, one or more healthcare experts 702 provide expert answers to a healthcare expert creation platform 704. In some embodiments, the expert answers may be reviewed by a quality and/or moderation functionality 712. In some embodiments, a language model (e.g., GPT-4 or GPT-4o) may provide quality and/or moderation functionality. For example, a language model may provide a quality check to the expert answers and may exclude and/or prohibit certain answers (e.g., for subject matter and/or answers that are controversial or illegal), from the healthcare expert creation platform 704. The healthcare expert creation platform 704 may be utilized by various services. In some embodiments, users 710 interact with a chat functionality, such as Copilot 706. An example of interaction with a chat functionality is further discussed in connection with FIG. 11. In some embodiments, users 710 may interact with a search engine, such as Bing 714. An example of interacting with Bing and also with the Bing search engine results page (Bing SERP) is further discussed in connection with FIGS. 8 and 11. Furthermore, in some embodiments, when users 710 want to request information from experts, these questions from users 708 first need to go through the quality and/or moderation functionality 712 to exclude any questions relating to excluded subject matter.

In some embodiments, information stored in the healthcare expert creation platform 704, may be utilized in other ways as well. For example, the expert answers may be utilized in creating news articles 716, such as MSN news. An example of news articles 716 are further discussed in connection with FIG. 9. In some embodiments, expert answers may be utilized in providing articles via a taskbar of an operating system, such as Windows taskbar 718. In some embodiments, expert answers may be utilized in providing a 'tip of the day' 720. An example of expert answer utilized in providing a tip of the day 720 is further discussed in connection with FIG. 12. In some embodiments, the healthcare expert creation platform 704 includes an expert community 722. The expert community 722 may include profiles of various experts, which may provide valuable information to the users 710. An example of utilizing the expert community 722 for providing expert profiles is further discussed in connection to FIG. 10.

Figure 8:
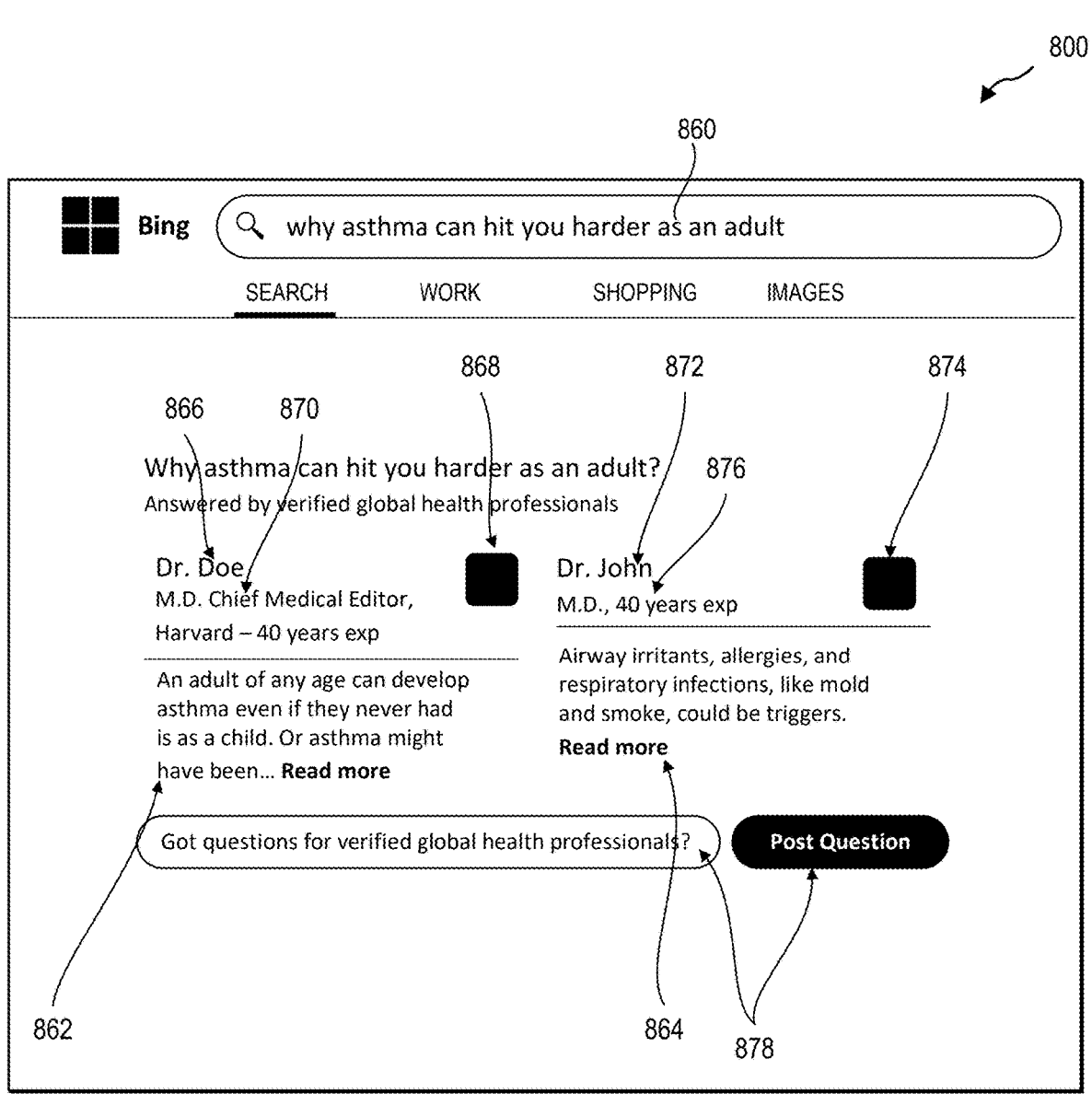
FIG. 8 illustrates an example of a user interface implementing features and providing functionalities described herein.

FIG. 8 illustrates an example of a user interface 800 implementing one or more features and/or providing one or more functionalities described herein. The user interface 800 includes a search window 860 where a user may provide input (e.g., their search query). As shown in FIG. 8, a result showing two expert answers (e.g., first answer 862 and a second answer 864). The expert answers may be highlighted (e.g., shown at the beginning of the results page) to the user (e.g., using the user interface 800). The first answer 862 may show one or more of a name of the first expert 866, a picture of the first expert 868, or qualifications of the first expert 870 (e.g., their expertise). The second answer 864 may show one or more of a name of a second expert 872, a picture of the second expert 874, or qualifications of the second expert 876 (e.g., their expertise). In some embodiments, if no appropriate expert answer is identified and/or if the user has a more specific question, the user interface 800 may provide an option to ask an expert a question by using, for example, the post question 878 field in the user interface 800. The user question may be forwarded to one or more experts, who may provide an answer to the user. The answer may be stored in the expert knowledge database. The user may receive a notification (e.g., an Edge notification) when an answer is available (usually within 48 hours). However, if the submitted question and/or the provided response includes excluded, illegal, and/or prohibited subject matter (e.g., it provides a doctor consultation experience, is related to drugs, teen pregnancies, or is illegal), the question and/or the answer may be archived and/or only the original search results may be provided (e.g., via the user interface 800).

FIG. 9 illustrates an example 900 of utilizing an expert knowledge database in creating articles (e.g., MSN news). In some embodiments, when different experts' answers relate to a common topic, the experts' answers may be used (e.g., combined) to create an article, such as the article 910 in FIG. 9. Article creation may be automatic. For example, one or more machine learning models (e.g., a language or other model) may be used to decide one or more topics for the article, which experts and/or which answers to utilize, what pictures to use in the article, whether the article created will be a slideshow article or a document article, other aspects of the article, or combinations thereof. In some embodiments, one or more of the experts' answers are not modified (e.g., by one or more machine learning models), but one or more machine learning model may be used for drafting the article. The article may be published for indexing by one or more search engines, such as Bing or Google.

Figure 10:
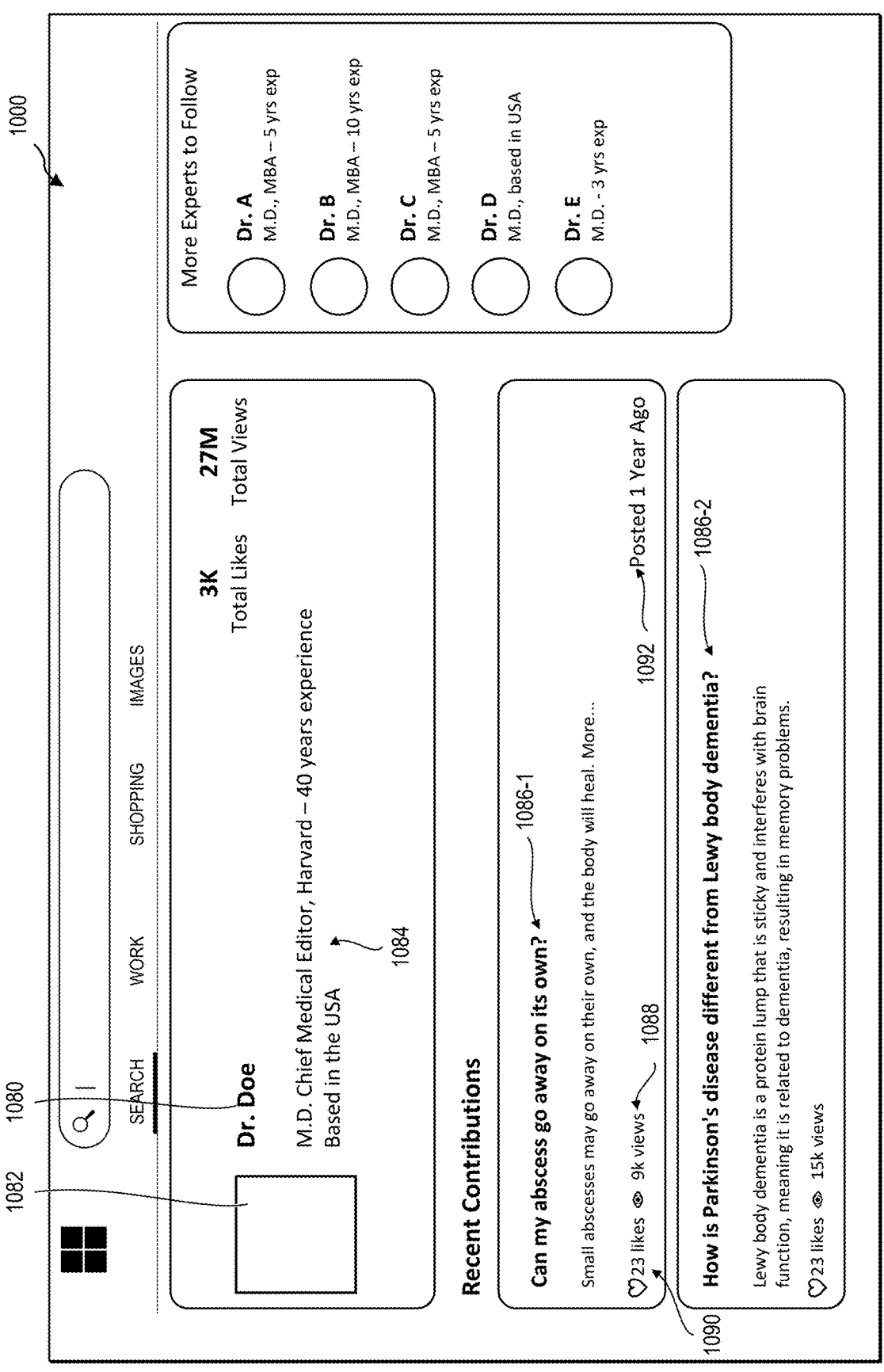
FIG. 10 illustrates an example of an expert profile viewable via a user interface.

FIG. 10 illustrates an example of an expert profile 1000 viewable via a user interface, such as the user interface 800 shown on FIG. 8. For example, a user may, via user interface 800, view the second expert's profile by selecting (e.g., clicking) the name of the second expert 872 and/or the picture of the second expert 874. The user may view one or more of the name 1080, the picture 1082, or additional personal information 1084 about the expert (e.g., how long the expert has practiced, the location of the expert, the training/qualifications the expert has received) via the expert profile 1000. For example, as shown in FIG. 10, the expert has 40 years of experience, practices in the United States, and is a Doctor of Medicine.

In some embodiments, the expert profile 1000 lists one or more expert answers, previously provided. As shown in FIG. 10, the expert has provided two expert answers; a first expert answer 1086-1 and a second expert answer 1086-2. In some embodiments, the expert profile 1000 provides a counter 1088 of how many times the expert answer has been viewed (e.g., opened or accessed). For example, in FIG. 10, the counter 1088 shows that the first expert answer 1086-1 has been viewed nine thousand times.

In some embodiments, when a user views an expert answer, the user is provided with an option to "like" or otherwise indicate the helpfulness of the expert answer. In some embodiments, the expert profile 1000 shows a counter 1090 of how many "likes" each of the one or more expert answers has received. For example, in FIG. 10, the counter 1090 shows that the first expert answer 1086-1 has received twenty-three likes from different users.

In some embodiments, the expert profile 1000 includes a counter 1092 that indicates the age of the expert answer. For example, in FIG. 10, the first expert answer 1086-1 was submitted one year ago. In some embodiments, the counter 1088, the counter 1090, and the counter 1092 may show the exact number of likes, days, and/or views. In some embodiments, the counter 1088, the counter 1090, and the counter 1092 may show an approximate number of likes, days, and/or views.

In some embodiments, the one or more computing node(s) 102 may use one or more of the additional personal information 1084, the counter 1090, the counter 1088, or the counter 1092 information for making a determination of which expert's answers to show to a user.

FIG. 11 illustrates an example 1100 of utilizing expert answers in chat queries. As shown in FIG. 11, a user has provided a chat query regarding adult-onset asthma. The chat functionality may then utilize one or more experts' answers in the provided chat response 1194.

Figure 12:
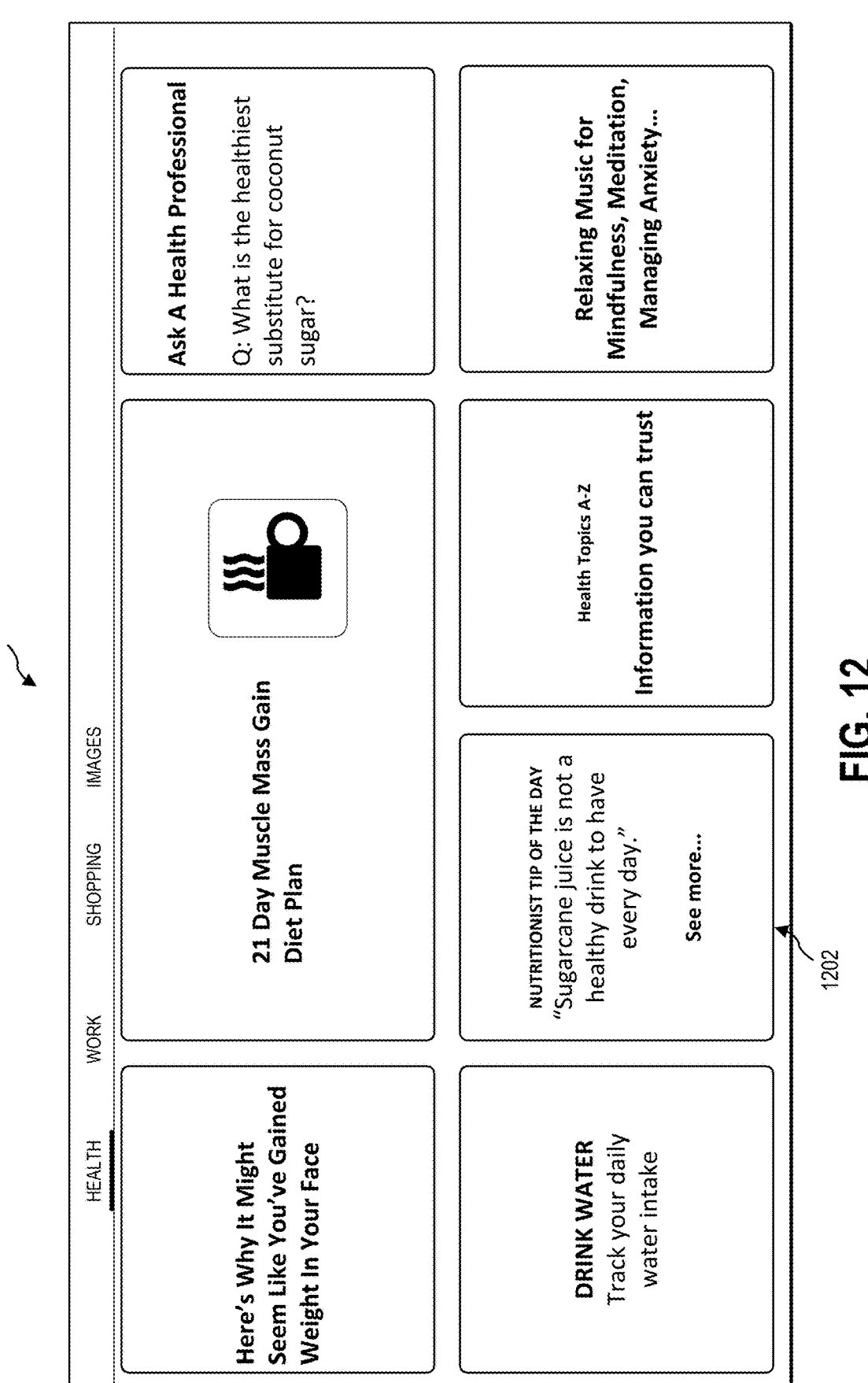
FIG. 12 illustrates an example of utilizing expert's answers in tip of the day.

FIG. 12 illustrates an example 1200 of utilizing expert's answers in a tip of the day. A tip of the day 1202 typically is very generic high-level information relevant for a majority of users. A tip of the day 1202 may be displayed at least in part with one or more other news articles.

Figure 13:
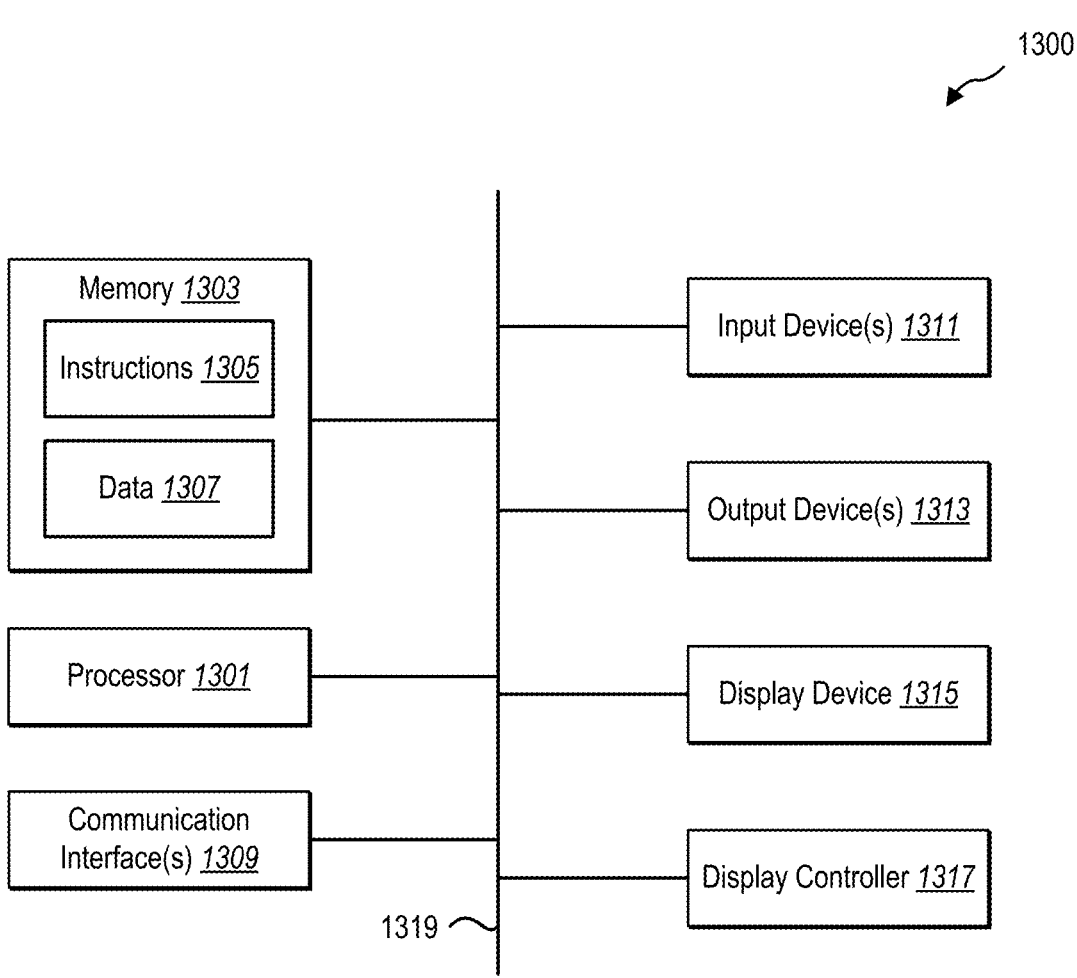
FIG. 13 illustrates certain components that may be included within a computer system.

FIG. 13 illustrates certain components that may be included within a computer system 1300, such as the computing node(s) as discussed in connection with FIG. 1, FIG. 3, and FIG. 4. One or more computer systems 1300 may be used to implement the various devices, components, and systems described herein.

The computer system 1300 includes a processor 1301. The processor 1301 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1301 may be referred to as a central processing unit (CPU). Although just a single processor 1301 is shown in the computer system 1300 of FIG. 13, in an alternative configuration, a combination of processors (e.g., an ARM and DSP) could be used.

The computer system 1300 also includes memory 1303 in electronic communication with the processor 1301. The memory 1303 may be any electronic component capable of storing electronic information. For example, the memory 1303 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1305 and data 1307 may be stored in the memory 1303. The instructions 1305 may be executable by the processor 1301 to implement some or all of the functionality disclosed herein. Executing the instructions 1305 may involve the use of the data 1307 that is stored in the memory 1303. Any of the various examples of modules and components described herein may be implemented, partially or wholly, as instructions 1305 stored in memory 1303 and executed by the processor 1301. Any of the various examples of data described herein may be among the data 1307 that is stored in memory 1303 and used during execution of the instructions 1305 by the processor 1301.

A computer system 1300 may also include one or more communication interfaces 1309 for communicating with other electronic devices. The communication interface(s) 1309 may be based on wired communication technology, wireless communication technology, or both. Some examples of communication interfaces 1309 include a Universal Serial Bus (USB), an Ethernet adapter, a wireless adapter that operates in accordance with an Institute of Electrical and Electronics Engineers (IEEE) 1302.11 wireless communication protocol, a Bluetooth® wireless communication adapter, and an infrared (IR) communication port.

A computer system 1300 may also include one or more input devices 1311 and one or more output devices 1313. Some examples of input devices 1311 include a keyboard, mouse, microphone, remote control device, button, joystick, trackball, touchpad, and lightpen. Some examples of output devices 1313 include a speaker and a printer. One specific type of output device that is typically included in a computer system 1300 is a display device 1315. Display devices 1315 used with embodiments disclosed herein may utilize any suitable image projection technology, such as liquid crystal display (LCD), light-emitting diode (LED), gas plasma, electroluminescence, or the like. A display controller 1317 may also be provided, for converting data 1307 stored in the memory 1303 into text, graphics, and/or moving images (as appropriate) shown on the display device 1315.

The various components of the computer system 1300 may be coupled together by one or more buses, which may include a power bus, a control signal bus, a status signal bus, a data bus, etc. For the sake of clarity, the various buses are illustrated in FIG. 13 as a bus system 1319.

This application relates to providing reliable expert answers according to the present disclosure. For example, embodiments of this application may be described according to any of the following sections:

A1. A computer-implemented method for providing reliable expert answers, comprising:

receiving a query;

identifying that the query relates to a field of expertise;

performing a search based on the query on an expert knowledge base vector space in the field of expertise;

identifying at least one expert answer from the expert knowledge base vector space that is responsive to the query; and providing a response to the query, wherein the response includes the at least one expert answer.

A2. The computer-implemented method of section A1, wherein the query is received from a user device.

A3. The computer-implemented method of section A1, wherein the query is received from a device partially under a control of a user.

A4. The computer-implemented method of section A1, wherein the query is received from a device not under control of a user.

A5. The computer-implemented method of section A2, wherein the query is received from a user interface displayed on the user device.

A6. The computer-implemented method of section A5, wherein the user interface is a search interface.

A7. The computer-implemented method of section A5, wherein the user interface is a chat interface.

A8. The computer-implemented method of section A5, wherein the user interface is an application interface.

A9. The computer-implemented method of section A8, wherein the application interface is a voice activated interface.

A10. The computer-implemented method of section A9, wherein the voice activated interface is one or more of Alexa, Siri, Cortana, Bing, an AI agent, or another voice activated interface.

A11. The computer-implemented method of any of sections A1-A10, wherein identifying that the query relates to the field of expertise further includes identifying a classification for the query.

A12. The computer-implemented method of section A11, wherein the classification for the query is similar as the classification for the field of expertise.

A13. The computer-implemented method of section A11, wherein identifying the classification for the query further includes identifying one or more characteristics of the query.

A14. The computer-implemented method of section A13, wherein identifying the one or more characteristics of the query include identifying one or more keywords in the query.

A15. The computer-implemented method of any of sections A13 or A14, wherein the one or more characteristics of the query include one or more of a query complexity score, a vocabulary score, query length, prior queries, subsequent queries.

A16. The computer-implemented method of section A15, wherein the query complexity score includes complex sentence structure.

A17. The computer-implemented method of section A16, wherein the complex sentence structure includes an if-statement.

A18. The computer-implemented method of any of sections A16 or A17, wherein the complex sentence structure includes a prepositional phrase.

A19. The computer-implemented method of any of sections A16-A18, wherein the complex sentence structure includes proper capitalization and/or punctuation.

A20. The computer-implemented method of any of sections A15-A19, wherein the vocabulary score is based on a grade level test.

A21. The computer-implemented method of section A20, wherein the grade level test is based on a Fleish-Kinkaid reading ease score.

A22. The computer-implemented method of section A20, wherein the grade level test is based on a Fleish-Kinkaid grade level test.

A23. The computer-implemented method of section A20, wherein the grade level test is based on an average number of syllables in the query.

A24. The computer-implemented method of section A23, wherein the average number of syllables in the query is greater than 1.

A25. The computer-implemented method of section A24, wherein the average number of syllables in the query is greater than 1.5.

A26. The computer-implemented method of section A24, wherein the average number of syllables in the query is greater than 2.

A27. The computer-implemented method of any of sections A15-A26, wherein the query length is greater than 30 characters.

A28. The computer-implemented method of any of sections A15-A26, wherein the query length is greater than 40 characters.

A29. The computer-implemented method of any of sections A15-A26, wherein the query length is greater than 50 characters.

A30. The computer-implemented method of any of sections A15-A26, wherein the query length is greater than 70 characters.

A31. The computer-implemented method of any of sections A15-A26, wherein the query length is greater than 100 characters.

A32. The computer-implemented method of any of sections A15-A31, wherein the prior queries relate to same field of expertise.

A33. The computer-implemented method of any of sections A14-A32, wherein the one or more keywords are classified under the expert knowledge base vector space.

A34. The computer-implemented method of section A33, wherein classifying the one or more keywords under the expert knowledge base vector space includes including synonyms of the one or more keywords.

A35. The computer-implemented method of any of sections A1-A34, wherein identifying the at least one expert answer from the expert knowledge base vector space further includes converting the query to a query vector, wherein the query vector includes a set of values.

A36. The computer-implemented method of section A35, further including applying the query vector to the expert knowledge base vector space to identify the at least one expert answer stored in the expert knowledge base vector space.

A37. The computer-implemented method of any of sections A1-A36, wherein identifying the at least one expert answer further includes identifying a plurality of expert answers.

A38. The computer-implemented method of section A37, further including ranking the plurality of expert answers and providing in the response to the query a subset of the plurality of expert answers, wherein the subset of the plurality of expert answers has highest ranking.

A39. The computer-implemented method of section A38, wherein ranking of the plurality of expert answers is based on at least one or more of a location of an expert, number of years practiced as the expert in the field of expertise, elapsed time that has passed since the expert provided an answer, or number of likes the answer has received from users.

A40. The computer-implemented method of any of sections A1-A39, further including causing the at least one expert answer to be displayed to a user.

A41. The computer-implemented method of section A40, wherein the at least one expert answer is displayed together with normal search results.

A42. The computer-implemented method of any of sections A40 or A41, wherein the at least one expert answer is displayed together with information about the expert who provided the answer.

B1. A computer-implemented method for generating reliable expert answers, comprising:

receiving a query;

identifying that the query relates to a field of expertise;

performing a search on an expert knowledge base vector space in the field of expertise;

detecting that there is no expert answer in the expert knowledge base vector space that is responsive to the query; and transmitting the query to one or more verified experts in the field of expertise.

B2. The computer-implemented method of section B1, further including receiving an answer from the one or more verified experts.

B3. The computer-implemented method of section B2, further including identifying that the answer does not relate to one or more excluded subject matters.

B4. The computer-implemented method of section B3, further including providing a notification that the answer from the one or more verified experts is available for viewing.

B5. The computer-implemented method of any of sections B3 or B4, wherein the answer is stored in the expert knowledge base vector space in the field of expertise.

B6. The computer-implemented method of any of sections B1-B5, wherein transmitting the query to the one or more verified experts in the field of expertise further includes identifying that the query does not relate to one or more excluded subject matters.

B7. The computer-implemented method of any of sections B1-B6, wherein transmitting the query to the one or more verified experts in the field of expertise further includes providing an option for a user to send the query to the one or more verified experts.

C1. A computer-implemented method for creating an expert knowledge base vector space, comprising:

collecting a plurality of queries, wherein the plurality of queries relates to a field of expertise;

consolidating a subset of queries from the plurality of queries to a single question;

providing the single question to one or more experts in the field of expertise;

receiving an answer from the one or more experts in the field of expertise; and storing the subset of queries, the single question, and the answer from the one or more experts in the field of expertise to the expert knowledge base vector space.

C2. The computer-implemented method of section C1, wherein collecting the plurality of queries further includes identifying a classification for the plurality of queries and wherein the classification is similar to the field of expertise.

C3. The computer-implemented method of section C2, wherein identifying the classification for the plurality of queries further includes identifying one or more keywords in the plurality of queries.

C4. The computer-implemented method of section C3, wherein the one or more keywords are classified under the expert knowledge base vector space.

C5. The computer-implemented method of any of sections C1-C3, wherein consolidating the subset of queries further includes providing the subset of queries to a language model and receiving the single question from the language model based on the subset of queries.

C6. The computer-implemented method of any of sections C1-C5, wherein providing the single question to the one or more experts further includes identifying that the subset of queries relate to a subfield in the field of expertise and that the one or more experts are experts in the subfield in the field of expertise.

D1. A system for providing reliable expert answers, comprising:

an expert knowledge base vector space configured to provide expert answers to a query; and a processor configured to:

identify a query classification;

compare the query classification to at least one expert knowledge base vector space classification;

convert the query into a query vector, upon identifying that the query classification is similar to the at least one expert knowledge base vector space classification;

apply the query vector to the expert knowledge base vector space to identify an expert answer from the expert knowledge base vector space that is responsive to the query; and provide a response to the query.

E1. A computer-implemented method for determining one or more reliable expert answer vectors in one or more expert knowledge base vector spaces, comprising:

in response to receiving a query relating to a field of expertise, identifying an expert knowledge base vector space in the field of expertise that includes answer vectors only from expert identifiers determined to be experts in the field of expertise;

based on converting the query into a query vector, mapping the query vector into the expert knowledge base vector space;

identifying an expert answer vector of an expert answer within a threshold distance of the query vector in the expert knowledge base vector space; and providing the expert answer associated with the expert answer vector in response to the query without modifying the expert answer.

E2. The computer-implemented method of section E1, further comprising determining the field of expertise for the query based on identifying a classification for the query where the classification is assigned to the field of expertise, and wherein identifying the expert knowledge base vector space in the field of expertise includes using the field of expertise to select the expert knowledge base vector space from a set of expert knowledge base vector spaces corresponding to different expertise fields.

E3. The computer-implemented method of section E2, wherein identifying the classification for the query is based on one or more of a keyword of the query, a query complexity score, a vocabulary score, a query length, one or more prior queries, or one or more subsequent queries.

E4. The computer-implemented method of section E3, wherein the keyword corresponds to an assigned keyword associated with the expert knowledge base vector space.

E5. The computer-implemented method of any of the sections E1-E4, wherein identifying the expert answer vector in the expert knowledge base vector space includes identifying a plurality of expert answer vectors within the threshold distance of the query vector in the expert knowledge base vector space.

E6. The computer-implemented method of section E5, wherein identifying the expert answer vector in the expert knowledge base vector space further includes: ranking each of the plurality of expert answer vectors within the threshold distance of the query vector; and providing a subset of expert answers associated with the plurality of expert answer vectors in response to the query, wherein the subset of expert answers includes the expert answer and are associated with a subset of expert answer vectors having a highest ranking among the plurality of expert answer vectors within the threshold distance of the query vector.

E7. The computer-implemented method of section E6, wherein:

ranking of the plurality of expert answer vectors is based on one or more expert attributes of the expert identifiers associated with each of the plurality of expert answer vectors; and the one or more expert attributes include a location of an expert, a number of years practiced as an expert in the field of expertise, or an amount of elapsed time since the expert provided the expert answer.

E8. The computer-implemented method of sections E5-E6, wherein the plurality of expert answer vectors includes one or more expert answer vectors with a shorter distance to the query vector than the expert answer vector.

E9. The computer-implemented method of any of the sections E1-E8, wherein identifying an expert answer vector includes:

identifying one or more prohibited subject matters based on a location of a user; and determining that the expert answer does not relate to the one or more prohibited subject matters.

F1. A computer-implemented method for determining one or more reliable expert answer vectors in one or more expert knowledge base vector spaces, comprising:

in response to receiving a query relating to a field of expertise, identifying an expert knowledge base vector space in the field of expertise that includes answer vectors only from expert identifiers determined to be experts in the field of expertise;

based on converting the query into a query vector, mapping the query vector into the expert knowledge base vector space;

determining that no expert answer vectors are within a threshold distance of the query vector in the expert knowledge base vector space;

obtaining an expert answer from a verified expert identifier determined to be the expert in the field of expertise; and providing the expert answer in response to the query without modifying the expert answer.

F2. The computer-implemented method of section F1, further comprising:

generating an expert answer vector by encoding the expert answer upon obtaining the expert answer; and storing the expert answer vector within the expert knowledge base vector space.

F3. The computer-implemented method of section F2, wherein storing the expert answer vector with the expert knowledge base vector space is based on determining that the expert answer vector is within the threshold distance to the query vector within the expert knowledge base vector space.

F4. The computer-implemented method of any of the sections F1-F3, wherein obtaining the expert answer further including determining that the query does not relate to one or more excluded subject matters that are prohibited based on a geographic location of a user identifier.

F5. The computer-implemented method of any of the sections F1-F4, wherein obtaining the expert answer further includes:

identifying one or more verified expert identifiers within the field of expertise; and selecting the verified expert identifier from the one or more verified expert identifiers based on a location of the verified expert identifier in relation to a location of a user identifier of the query.

F6. The computer-implemented method of any of sections F1-F5, further comprising providing a notification to a user identifier that submitted the query that the expert answer is available for viewing.

F7. The computer-implemented method of section any of the sections F1-F6, wherein obtaining the expert answer further includes:

consolidating multiple queries relating to the field of expertise including the query into a single query;

submitting the single query to the verified expert identifier determined to be an expert in the field of expertise; and receiving an answer to the single query from the verified expert identifier that includes the expert answer.

F8. The computer-implemented method of any of the sections F1-F7, further comprising determining the field of expertise for the query based on identifying a classification for the query where the classification is assigned to the field of expertise, and wherein identifying the expert knowledge base vector space in the field of expertise includes using the field of expertise to select the expert knowledge base vector space from a set of expert knowledge base vector spaces corresponding to different expertise fields.

F9. The computer-implemented method of section F8, wherein identifying the classification for the query is based on identifying a keyword within the query that corresponds to an assigned keyword associated with the expert knowledge base vector space.

F10. The computer-implemented method of section F8, wherein identifying the classification for the query is based on a query complexity score, a vocabulary score, a query length, or a prior query.

G1. A system, comprising:

at least one processor; and a non-transitory computer memory comprising instructions that, when executed by the at least one processor, cause the system to perform operations of:

in response to receiving a query relating to a field of expertise, identifying an expert knowledge base vector space in the field of expertise that includes answer vectors only from expert identifiers determined to be experts in the field of expertise;

based on converting the query into a query vector, mapping the query vector into the expert knowledge base vector space;

identifying an expert answer vector of an expert answer within a threshold distance of the query vector in the expert knowledge base vector space; and providing the expert answer associated with the expert answer vector in response to the query without modifying the expert answer.

Embodiments of the present disclosure may thus utilize a special purpose or general-purpose computing system including computer hardware, such as, for example, one or more processors and system memory. Embodiments within the scope of the present disclosure also include physical and other computer-readable media for carrying or storing computer-executable instructions and/or data structures, including applications, tables, data, libraries, or other modules used to execute particular functions or direct selection or execution of other modules. Such computer-readable media can be any available media that can be accessed by a general purpose or special purpose computer system. Computer-readable media that store computer-executable instructions (or software instructions) are physical storage media. Computer-readable media that carry computer-executable instructions are transmission media. Thus, by way of example, and not limitation, embodiments of the present disclosure can include at least two distinctly different kinds of computer-readable media, namely physical storage media or transmission media. Combinations of physical storage media and transmission media should also be included within the scope of computer-readable media.

Both physical storage media and transmission media may be used to temporarily store or carry software instructions in the form of computer readable program code that allows the performance of embodiments of the present disclosure. Physical storage media may further be used to persistently or permanently store such software instructions. Examples of physical storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored as or in software, hardware, firmware, or combinations thereof.

A "network" or "communications network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general purpose or special purpose computer.

Further, upon reaching various computer system components, program code in the form of computer-executable instructions or data structures can be transferred automatically or manually from transmission media to physical storage media (or vice versa). For example, computer-executable instructions or data structures received over a network or data link can be buffered in memory (e.g., RAM) within a network interface module (NIC), and then eventually transferred to computer system RAM and/or to less volatile physical storage media at a computer system. Thus, it should be understood that physical storage media can be included in computer system components that also (or even primarily) utilize transmission media.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that fall within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any refer- ences to "up" and "down" or "above" or "below" are merely descriptive of the relative position or movement of the related elements.

The present disclosure may be embodied in other specific forms without departing from its spirit or characteristics. The described embodiments are to be considered as illus- trative and not restrictive. The scope of the disclosure is, therefore, indicated by the appended claims rather than by the foregoing description. Changes that come within the meaning and range of equivalency of the claims are to be embraced within their scope.

The invention claimed is:

1. A computer-implemented method for determining one or more expert answer vectors in one or more expert knowledge base vector spaces, comprising:

in response to receiving a query relating to a field of expertise, determining the field of expertise for the query based on identifying a classification for the query, wherein the classification is assigned to the field of expertise;

identifying an expert knowledge base vector space in the field of expertise that includes answer vectors only from expert identifiers determined to be experts in the field of expertise, wherein identifying the expert knowledge base vector space in the field of expertise includes using the field of expertise to select the expert knowledge base vector space from a set of expert knowledge base vector spaces corresponding to differ- ent expertise fields;

based on converting the query into a query vector, map- ping the query vector into the expert knowledge base vector space;

automatically identifying a set of expert answer vectors within a threshold distance of the query vector in the expert knowledge base vector space, wherein the set of expert answer vectors includes a first expert answer vector by a first expert identifier and a second expert answer vector by a second expert identifier;

automatically selecting the first expert answer vector and the second expert answer vector based on distance to the query vector;

identifying a first expert profile based on the first expert identifier and identifying a second expert profile based on the second expert identifier;

obtaining a first expert answer that is mapped to the first expert answer vector and a second expert answer that is mapped to the second expert answer vector;

generating a first expert answer response element by combining the first expert answer with the first expert profile;

generating a second expert answer response element by combining the second expert answer with the second expert profile; and automatically causing a display on a client device that includes both the first expert answer response element with the first expert profile and the second expert answer response element with the second expert profile in response to the query.

2. The computer-implemented method of claim 1, wherein identifying the classification for the query is based on one or more of a keyword of the query, a query complexity score, a vocabulary score, a query length, one or more prior queries, or one or more subsequent queries.

3. The computer-implemented method of claim 2, wherein the keyword corresponds to an assigned keyword associated with the expert knowledge base vector space.

4. The computer-implemented method of claim 1, wherein identifying the set of expert answer vectors in the expert knowledge base vector space further includes:

ranking each expert answer vector in the set of expert answer vectors within the threshold distance of the query vector; and grouping expert answer vectors having a highest ranking among the set of expert answer vectors within the set of expert answer vectors.

5. The computer-implemented method of claim 4, wherein:

ranking of the set of expert answer vectors is based on one or more expert attributes of the expert identifiers asso- ciated with each of the set of expert answer vectors; and the one or more expert attributes include a geographical location of an expert identifier, a number of years practiced as an expert in the field of expertise, or an amount of elapsed time since the expert provided the first expert answer.

6. The computer-implemented method of claim 1, wherein the set of expert answer vectors includes one or more expert answer vectors with a shorter distance to the query vector than the first expert answer vector.

7. The computer-implemented method of claim 1, wherein identifying the first expert answer vector includes:

identifying one or more prohibited subject matters based on a geographical location of a user identifier; and determining that the first expert answer does not relate to the one or more prohibited subject matters.

8. A computer-implemented method for determining one or more expert answer vectors in one or more expert knowledge base vector spaces, comprising:

receiving multiple queries that relating to a field of expertise;

providing the multiple queries to a generative AI model to consolidate the multiple queries into a single query for the field of expertise;

in response to receiving a single query relating to the field of expertise, determining the field of expertise for the single query based on identifying a classification for the single query, wherein the classification is assigned to the field of expertise;

identifying an expert knowledge base vector space in the field of expertise that includes answer vectors only from expert identifiers determined to be experts in the field of expertise, wherein identifying the expert knowledge base vector space in the field of expertise includes using the field of expertise to select the expert knowledge base vector space from a set of expert knowledge base vector spaces corresponding to differ- ent expertise fields;

based on converting the single query into a query vector, mapping the query vector into the expert knowledge base vector space;

automatically identifying a set of expert answer vectors within a threshold distance of the query vector in the expert knowledge base vector space, wherein the set of expert answer vectors includes a first expert answer vector by a first expert identifier and a second expert answer vector by a second expert identifier;

automatically selecting the first expert answer vector and the second expert answer vector based on distance to the query vector;

identifying a first expert profile based on the first expert identifier and identifying a second expert profile based on the second expert identifier;

obtaining a first expert answer that is mapped to the first expert answer vector and a second expert answer that is mapped to the second expert answer vector;

generating a first expert answer response element by combining the first expert answer with the first expert profile;

generating a second expert answer response element by combining the second expert answer with the second expert profile; and automatically causing a display on a client device that includes both the first expert answer response element with the first expert profile and the second expert answer response element with the second expert profile in response to the single query.

9. The computer-implemented method of claim 8, further comprising:

generating the first expert answer vector by encoding the first expert answer upon obtaining the first expert answer; and storing the first expert answer vector within the expert knowledge base vector space for the field of expertise.

10. The computer-implemented method of claim 8, wherein generating the first expert answer vector from the one or more expert answer vectors includes:

identifying a first query relating to the field of expertise;

obtaining the first expert answer to the first query by the first expert identifier;

identifying additional related queries related to the first query in the field of expertise; and generating the first expert answer using an embedding machine learning model from the first query, the first expert answer, and the additional related queries.

11. The computer-implemented method of claim 8, wherein obtaining the first expert answer further includes:

identifying one or more expert identifiers within the field of expertise; and selecting the first expert identifier from the one or more expert identifiers based on a geographical location of a first expert identifier in relation to a geographical location of a user identifier of the single query.

12. The computer-implemented method of claim 8, further comprising providing a notification to a user identifier that submitted the single query that the first expert answer is available for viewing.

13. The computer-implemented method of claim 8, wherein obtaining the first expert answer further includes:

submitting the single query to the first expert identifier determined to be an expert in the field of expertise; and receiving an answer to the single query from the first expert identifier that includes the first expert answer.

14. The computer-implemented method of claim 10, wherein identifying the classification for the single query is based on identifying a keyword within the single query that corresponds to an assigned keyword associated with the expert knowledge base vector space.

15. The computer-implemented method of claim 10, wherein identifying the classification for the single query is based on a query complexity score, a vocabulary score, a query length, or a prior query.

16. A system, comprising:

at least one processor; and a non-transitory computer memory comprising instructions that, when executed by the at least one processor, cause the system to perform operations of:

in response to receiving a query relating to a field of expertise, determining the field of expertise for the query based on identifying a classification for the query, wherein the classification is assigned to the field of expertise;

identifying an expert knowledge base vector space in the field of expertise that includes answer vectors only from expert identifiers determined to be experts in the field of expertise, wherein identifying the expert knowledge base vector space in the field of expertise includes using the field of expertise to select the expert knowledge base vector space from a set of expert knowledge base vector spaces corresponding to different expertise fields;

based on converting the query into a query vector, mapping the query vector into the expert knowledge base vector space;

automatically identifying a set of expert answer vectors within a threshold distance of the query vector in the expert knowledge base vector space, wherein the set of expert answer vectors includes a first expert answer vector by a first expert identifier and a second expert answer vector by a second expert identifier;

automatically selecting the first expert answer vector and the second expert answer vector based on distance to the query vector;

identifying a first expert profile based on the first expert identifier and identifying a second expert profile based on the second expert identifier;

obtaining a first expert answer that is mapped to the first expert answer vector and a second expert answer that is mapped to the second expert answer vector;

generating a first expert answer response element by combining the first expert answer with the first expert profile;

generating a second expert answer response element by combining the second expert answer with the second expert profile; and automatically causing a display on a client device that includes both the first expert answer response element with the first expert profile and the second expert answer response element with the second expert profile in response to the query without modifying the first expert answer or the second expert answer.

17. The system of claim 16, wherein identifying the classification for the query is based on one or more of a keyword of the query, a query complexity score, a vocabulary score, a query length, one or more prior queries, or one or more subsequent queries.

18. The system of claim 17, wherein the keyword corresponds to an assigned keyword associated with the expert knowledge base vector space.

19. The system of claim 16, wherein identifying the set of expert answer vectors in the expert knowledge base vector space further includes:

ranking each expert answer vector in the set of expert answer vectors within the threshold distance of the query vector; and grouping expert answer vectors having a highest ranking among the set of expert answer vectors within the set of expert answer vectors.

20. The system of claim 19, wherein:

ranking of the set of expert answer vectors is based on one or more expert attributes of the expert identifiers associated with each of the set of expert answer vectors; and the one or more expert attributes include a geographical location of an expert identifier, a number of years practiced as an expert in the field of expertise, or an amount of elapsed time since the expert provided the first expert answer.

\* \* \* \* \*